US012768387B2

(12) United States Patent
Watanabe

(10) Patent No.: US 12,768,387 B2
(45) Date of Patent: Oct. 20, 2026

(54) FASTENER SUPPORT, COUPLED FASTENER, AND MANUFACTURING METHOD OF FASTENER SUPPORT

(71) Applicant: Max Co., Ltd., Tokyo (JP)

(72) Inventor: Eiichi Watanabe, Tokyo (JP)

(73) Assignee: Max Co., Ltd., Tokyo (JP)

( * ) Notice: Subject to any disclaimer, the term of this patent is extended or adjusted under 35 U.S.C. 154(b) by 229 days.

(21) Appl. No.: 18/799,250

(22) Filed: Aug. 9, 2024

(65) Prior Publication Data

US 2025/0052268 A1 Feb. 13, 2025

(30) Foreign Application Priority Data

Aug. 10, 2023 (JP) ................................ 2023-131342

(51) Int. Cl.
*F16B 15/08* (2006.01)
*B25C 1/00* (2006.01)
*B25C 1/04* (2006.01)

(52) U.S. Cl.
CPC .............. *F16B 15/08* (2013.01); *B25C 1/005* (2013.01); *B25C 1/047* (2013.01)

(58) Field of Classification Search
CPC .......... F16B 15/08; F16B 27/00; B25C 1/005; B25C 1/003
USPC .......................................................... 411/442
See application file for complete search history.

(56) References Cited

U.S. PATENT DOCUMENTS 3,450,255 A 6/1969 Mosetich
4,684,022 A * 8/1987 Potucek .................. F16B 15/08 206/820
6,074,149 A * 6/2000 Habermehl ........... F16B 35/044 206/347
8,328,012 B2 * 12/2012 Miescher ................ F16B 27/00 411/443
8,721,244 B2 * 5/2014 Nakagawa .............. F16B 15/08 206/347

(Continued)

FOREIGN PATENT DOCUMENTS

EP 0908635 A1 * 4/1999 .............. F16B 27/00
EP 2295821 A2 * 3/2011 ............. B25C 1/005

(Continued)

OTHER PUBLICATIONS

Oct. 22, 2024—Extended European Search Report—App 24193570.9.
JP-Information offer 2023-131342 on May 20, 2025.

*Primary Examiner* — Jason D Shanske
(74) *Attorney, Agent, or Firm* — Banner & Witcoff, Ltd.

(57) ABSTRACT

A fastener support includes: a plate-shaped member having a first portion and a second portion; a first tab erected from the first portion and having a first support portion supporting a first position of a fastener; and a second tab erected from a lower end of the second portion and having a second support portion supporting a second position of the fastener. The first portion has a first opening. The second portion has a second opening which allows at least a part of the fastener to be visually recognized from the rear. The first tab includes a pair of first leg portions erected from the first portion with the first opening interposed therebetween. The second tab includes a pair of second leg portions erected from the lower end of the second portion with the second opening interposed therebetween.

14 Claims, 15 Drawing Sheets

(56) References Cited

U.S. PATENT DOCUMENTS

| | | | | |
|---|---|---|---|---|
| 11,624,391 | B2 * | 4/2023 | Arai | F16B 43/00 411/442 |
| 11,746,814 | B2 * | 9/2023 | Miescher | B25C 1/184 411/442 |
| 2014/0026409 | A1 * | 1/2014 | Liu | B25C 5/1617 29/811.2 |
| 2019/0301512 | A1 * | 10/2019 | Nakagawa | F16B 15/08 |
| 2020/0208668 | A1 * | 7/2020 | Arai | F16B 15/08 |

FOREIGN PATENT DOCUMENTS

| | | | | | |
|---|---|---|---|---|---|
| JP | H01-206106 | A | | 8/1989 | |
| JP | H01-135214 | U | | 9/1989 | |
| JP | H03-026329 | A | | 2/1991 | |
| JP | H03-026329 | Y2 | | 6/1991 | |
| JP | H03-096417 | U | | 10/1991 | |
| JP | H0348408 | Y2 | * | 10/1991 | |
| JP | H0741025 | U | * | 7/1995 | |
| JP | H1182443 | A | * | 3/1999 | |
| JP | 2918439 | B2 | * | 7/1999 | |
| JP | 2012-002331 | A | | 1/2012 | |
| WO | WO-2005028160 | A2 | * | 3/2005 | F16B 15/08 |

* cited by examiner

FASTENER SUPPORT, COUPLED FASTENER, AND MANUFACTURING METHOD OF FASTENER SUPPORT

CROSS-REFERENCE TO RELATED APPLICATIONS

The present application claims priority from Japanese Patent Application No. 2023-131342 filed on Aug. 10, 2023, the entire contents of which are incorporated herein by reference.

TECHNICAL FIELD

The present disclosure relates to a fastener support, a coupled fastener, and a manufacturing method of a fastener support.

BACKGROUND ART

A fastener, such as a screw and a nail, for fixing a workpiece by being driven into the workpiece is known. A plurality of fasteners are supported in a coupled state by a coupling band, to which fastener supports for supporting the fasteners are coupled. The coupled fastener is used by being loaded in a magazine of a driving tool. The fastener set in the magazine is struck by a driver that is driven by compressed air or the like so as to be separated from the fastener support and driven into the workpiece.

U.S. Pat. No. 3,450,255A discloses an example of the coupled fastener and the driving tool. JPH03-026329Y2 and JPH01-206106A also show an example of the coupled fastener.

SUMMARY

Illustrative aspects of the present disclosure provide a fastener support, a coupled fastener, and a manufacturing method of a fastener support, which allow for a reduction in an outer diameter when fasteners are coupled and wound in a coil shape while stabilizing a driving posture of the fasteners.

One illustrative aspect of the present disclosure provides a fastener support including: a plate-shaped member having a first portion which is a lower portion and a second portion which is an upper portion; a first tab erected from the first portion, the first tab having a first support portion that detachably supports a first position of a fastener in front of the plate-shaped member; and a second tab erected from a lower end of the second portion, the second tab having a second support portion that detachably supports a second position of the fastener, which is above the first position, in front of the plate-shaped member. The first portion has a first opening, which is connected to a lower end and an upper end of the first portion, and through which the second tab is allowed to pass in a case where the second tab is rotated about the lower end of the second portion as a fulcrum. The second portion has a second opening, which is connected to an upper end of the first opening at the lower end of the second portion, and which allows at least a part of the fastener from the second position of the fastener to be visually recognized from the rear. The first tab includes a pair of first leg portions that are erected from the first portion with the first opening interposed therebetween and connect the first support portion to the first portion. The second tab includes a pair of second leg portions that are erected from the lower end of the second portion with the second opening interposed therebetween and connect the second support portion to the second portion.

Another illustrative aspect of the present disclosure provides a coupled fastener that couples a plurality of fastener supports each of which supports a fastener, the coupled fastener including: a plate-shaped member having a first portion which is a lower portion and a second portion which is an upper portion; a first tab erected from the first portion and having a first support portion that detachably supports a first position of the fastener in front of the plate-shaped member; and a second tab erected from a lower end of the second portion and having a second support portion that detachably supports a second position above the first position of the fastener in front of the plate-shaped member. The first portion has a first opening, which is connected to a lower end and an upper end of the first portion, and through which the second tab is allowed to pass in a case where the second tab is rotated about the lower end of the second portion as a fulcrum. The second portion has a second opening, which is connected to an upper end of the first opening at the lower end of the second portion, and which allows at least a part of a fastener head portion of the fastener from the second position of the fastener to be visually recognized from the rear. The first tab includes a pair of first leg portions that are erected from the first portion with the first opening interposed therebetween and connect the first support portion to the first portion. The second tab includes a pair of second leg portions that are erected from the lower end of the second portion with the second opening interposed therebetween and connect the second support portion to the second portion. A plurality of the fastener supports are provided in a state in which the first portion of one of adjacent fastener supports is coupled to the first portion of the other of the adjacent fastener supports, and the second portion of the one of the adjacent fastener supports is coupled to the second portion of the other of the adjacent fastener supports.

Still another illustrative aspect of the present disclosure provides a coupled fastener to be loaded into a driving tool that drives a fastener into a workpiece, the coupled fastener including: a plate-shaped member having a first portion which is a lower portion and a second portion which is an upper portion; a first tab erected from the first portion and having a first support portion that detachably supports a first position of a fastener in front of the plate-shaped member; and a second tab erected from a lower end of the second portion and having a second support portion that detachably supports a second position above the first position of the fastener in front of the plate-shaped member. The first portion has a first opening, which is connected to a lower end and an upper end of the first portion, and through which the second tab is allowed to pass in a case where the second tab is rotated about the lower end of the second portion as a fulcrum. The second portion has a second opening, which is connected to an upper end of the first opening at the lower end of the second portion, and which allows at least a part of a fastener head portion of the fastener to be visually recognized from the rear from the second position of the fastener. The first tab includes a pair of first leg portions that are erected from the first portion and connect the first support portion to the first portion with the first opening interposed therebetween. The second tab includes a pair of second leg portions that are erected from the lower end of the second portion and connect the second support portion to the second portion with the second opening interposed therebetween. The coupled fastener is configured to allow an engaging claw provided in the driving tool to enter the second opening, a region between the pair of second leg portions, the first opening, and a region between the pair of first leg portions and to be engaged.

Still another illustrative aspect of the present disclosure provides a manufacturing method of a fastener support, including: forming a plate-shaped original member having an upper end edge, a lower end edge, and a first side end edge and a second side end edge that connect the upper end edge to the lower end edge; forming a first cut, a second cut and an opening in the original member, the first cut connecting a first position that is closer to the upper end edge than to the lower end edge and closer to the first side end edge than to the second side end edge to a relay position that is closer to the lower end edge than to the upper end edge, the second cut connecting a second position that is closer to the upper end edge than to the lower end edge and closer to the second side end edge than to the first side end edge to the relay position, and the opening being located between the first position and the second position; providing a first tab by using a first virtual straight line passing through a position on the first cut closer to the relay position than to the first position and a position on the second cut closer to the relay position than to the second position as a crease and bending a portion of the original member including the lower end edge such that the portion is erected from the other portion, the first tab having a first support portion formed to be able to detachably support the first position of a fastener in front of the other portion; and providing a second tab by using a second virtual straight line passing through a position on the first cut closer to the first position than to the relay position and a position on the second cut closer to the second position than to the relay position and passing through the opening as a crease and bending a portion of the original member surrounded by the first cut and the second cut such that the portion is erected from the other portion, the second tab having a second support portion formed to be able to detachably support the second position of the fastener above the first position in front of the other portion.

DESCRIPTION OF EMBODIMENTS

Figure 1:
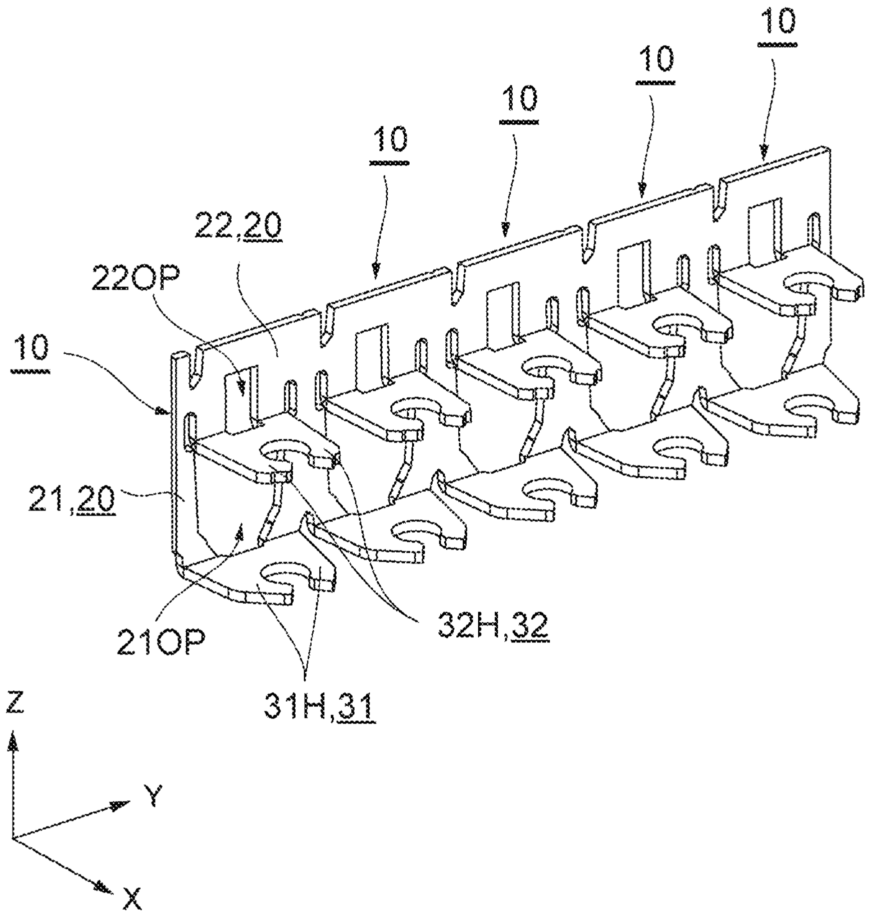
FIG. 1 is a perspective view of fastener supports according to an illustrative embodiment of the present disclosure.

In the above-described related arts, the fastener support has a configuration in which a head portion of the fastener is easily influenced by the fastener support when the fastener is driven. When the posture of the fastener becomes unstable due to the influence of the fastener support, since the fastener is inclined with respect to a driven member which is the workpiece, the fastener may not be accurately driven. In view of this, it is also conceivable to support the 20 fastener at a position largely separated from the fastener support such that the head portion of the fastener is hardly influenced by the fastener support. However, when a configuration in which the fastener is supported at the position largely separated from the fastener support is employed, a radius increases when the coupled fastener is wound in a spiral shape. This results in a reduction in the number of fasteners that can be loaded into the magazine.

Therefore, illustrative aspects of the present disclosure provide a fastener support, a coupled fastener, and a manufacturing method of a fastener support, which allow for a reduction in an outer diameter when fasteners are coupled and wound in a coil shape while stabilizing a driving posture of the fasteners.

The present application discloses a fastener support. The fastener support includes: a plate-shaped member having a first portion which is a lower portion and a second portion which is an upper portion; a first tab erected from the first portion, the first tab having a first support portion that detachably supports a first position of a fastener in front of the plate-shaped member; and a second tab erected from a lower end of the second portion, the second tab having a second support portion that detachably supports a second position of the fastener, which is above the first position, in front of the plate-shaped member. The first portion has a first opening, which is connected to a lower end and an upper end of the first portion, and through which the second tab is allowed to pass in a case where the second tab is rotated about the lower end of the second portion as a fulcrum. The second portion has a second opening, which is connected to an upper end of the first opening at the lower end of the second portion, and which allows at least a part of the fastener from the second position of the fastener to be visually recognized from the rear. The first tab includes a pair of first leg portions that are erected from the first portion with the first opening interposed therebetween and connect the first support portion to the first portion. The second tab includes a pair of second leg portions that are erected from the lower end of the second portion with the second opening interposed therebetween and connect the second support portion to the second portion.

The plate-shaped member is not limited to being formed in a rectangular shape. The plate-shaped member may include a member formed in a shape other than the rectangular shape extending in a two-dimensional direction (an upper-lower direction and a width direction), for example, a member formed in a shape indicated in the present illustrative embodiment.

The fastener support may further include a fastener to be supported. The fastener may include a nail and a screw. The fastener may further include another member for coupling a workpiece to another workpiece.

"A first opening through which the second tab can pass when the second tab is rotated about the lower end of the second portion as a fulcrum" includes an opening formed such that the second tab cannot pass through in a state in which the first tab is erected, and the second tab can pass through when the first tab is rotated (for example, a state in which the first tab rotates and becomes parallel to the lower portion).

Here, the "opening" such as the "first opening" is closed in a normal state in which no external force or the like is received, but includes a configuration in which the opening can be formed when an external force or the like is received.

For example, the first portion may have a first opening that is connected to a lower end and an upper end of the first portion. This opening allows the second tab to pass through when the second tab is rotated about the lower end of the second portion as a fulcrum. The first opening may be formed, for instance, by making three cuts in the first portion. Here, a first cut is formed to extend in the width direction at an upper portion of the first portion, for example. A second cut is formed to extend in the width direction at a lower portion of the first portion, for example. A third cut is formed to extend in the upper-lower direction so as to connect the first cut to the second cut.

Even with this configuration, when the plate-shaped member is pressed from a rear side by a member such as a check claw (which will be described later), both a portion of the first portion that is rightward of the third cut and is surrounded by the first cut and the second cut, and a portion of the first portion that is leftward of the third cut and is surrounded by the first cut and the second cut, can be pushed apart. This corresponds to a configuration where the opening can be formed when subject to an external force or similar.

In addition to, or as an alternative to, when the plate-shaped member is pressed from the rear side by the member such as the check claw, when the second tab rotates and presses the plate-shaped member from the front, both the section of the first portion that is rightward of the third cut and is surrounded by the first cut and the second cut and a section of the first portion that is leftward of the third cut and is surrounded by the first cut and the second cut, can be pushed apart by being pushed by the second tab. Therefore, such a configuration also corresponds to a configuration in which the opening can be formed when the external force or the like is received.

By way of further example, the first opening formed in the first portion may include an opening portion provided in the lower portion of the first portion and opened in the normal state in which no external force or the like is received, and a cut extending in the upper-lower direction to connect the opening portion to the second opening.

With this configuration, the opening portion of the "first opening" and the "second opening" are separated in the normal state in which no external force is received (that is, the plate-shaped member above the opening portion is closed), but when the external force is received, both the portion rightward of the cut and the portion leftward of the cut can be pushed apart, so this corresponds to a configuration that is configured to form the opening when the external force is received from, for example, the check claw, the rotating tab, the fastener, or the like. Here, a portion of the plate-shaped member in which the cut that couples the opening portion of the "first opening" to the "second opening" is formed may be referred to as a "coupling portion".

Similarly, the second opening formed in the second portion may include an opening portion provided in the upper portion of the second portion and opened in the normal state in which no external force or the like is received, and a cut extending in the upper-lower direction to connect the opening portion to the first opening.

However, the "opening" such as the "first opening" as disclosed in the present illustrative embodiment also includes a configuration in which the opening is formed in the normal state in which no external force or the like is received.

The present application further discloses a coupled fastener. The coupled fastener includes a plurality of the fastener supports and a plurality of the fasteners supported by the fastener supports. The first portion of one of the adjacent fastener supports is coupled to the first portion of the other of the adjacent fastener supports, and the second portion of one of the adjacent fastener supports is coupled to the second portion of the other of the adjacent fastener supports.

When the fastener is a nail, the coupled fastener may be called a coupled nail.

The coupled fastener may be a coupled fastener loaded into a driving tool that is configured to drive a fastener to a workpiece. The driving tool includes an engaging claw extending in the upper-lower direction. The fastener support is configured to be engaged by the engaging claw of the driving tool when the engaging claw enters the second opening of the fastener support, a region between the pair of second leg portions, the first opening, and a region between the pair of first leg portions.

The present application further discloses a manufacturing method of a fastener support. The manufacturing method of a fastener support includes: forming a plate-shaped original member having an upper end edge, a lower end edge, and a first side end edge and a second side end edge that connect the upper end edge to the lower end edge; forming a first cut, a second cut and an opening in the original member, the first cut connecting a first position that is closer to the upper end edge than to the lower end edge and closer to the first side end edge than to the second side end edge to a relay position that is closer to the lower end edge than to the upper end edge, the second cut connecting a second position that is closer to the upper end edge than to the lower end edge and closer to the second side end edge than to the first side end edge to the relay position, and the opening being located between the first position and the second position; providing a first tab by using a first virtual straight line passing through a position on the first cut closer to the relay position than to the first position and a position on the second cut closer to the relay position than to the second position as a crease and bending a portion of the original member including the lower end edge such that the portion is erected from the other portion, the first tab having a first support portion formed to be able to detachably support the first position of a fastener in front of the other portion; and providing a second tab by using a second virtual straight line passing through a position on the first cut closer to the first position than to the relay position and a position on the second cut closer to the second position than to the relay position and passing through the opening as a crease and bending a portion of the original member surrounded by the first cut and the second cut such that the portion is erected from the other portion, the second tab having a second support portion formed to be able to detachably support the second position of the fastener above the first position in front of the other portion.

Further, the present application discloses a fastener support that is configured to support a fastener extending in an upper-lower direction. The fastener support includes: a connection portion extending in a width direction; one first extending portion extending downward from one end portion in the width direction of the connection portion; the other first extending portion extending downward from the other end portion in the width direction; one first leg portion extending forward from the one first extending portion; the other first leg portion erected forward from the other first extending portion; a first support portion connecting a pair of first leg portion and first leg portion to each other and supporting a first position of the fastener in front of a pair of the first extending portion and the first extending portion; one second extending portion having a length shorter than that of the pair of first extending portion and first extending portion, provided between the pair of first extending portion and first extending portion, and extending downward from the connection portion at a position adjacent to the one first extending portion; the other second extending portion having a length shorter than that of the pair of first extending portion and first extending portion, provided between the pair of first extending portion and first extending portion, and extending downward from the connection portion at a position adjacent to the other first extending portion; one second leg portion erected forward from the one second extending portion; the other second leg portion erected forward from the other second extending portion; and a second support portion connecting a pair of second leg portion and second leg portion to each other and supporting a second position above the first position of the fastener in front of a pair of the second extending portion and the second extending portion.

Hereinafter, an illustrative embodiment of the present disclosure will be described with reference to the drawings. The following illustrative embodiment is an example for describing the present invention, and the present invention is not limited only to the illustrative embodiment.

Figure 2:
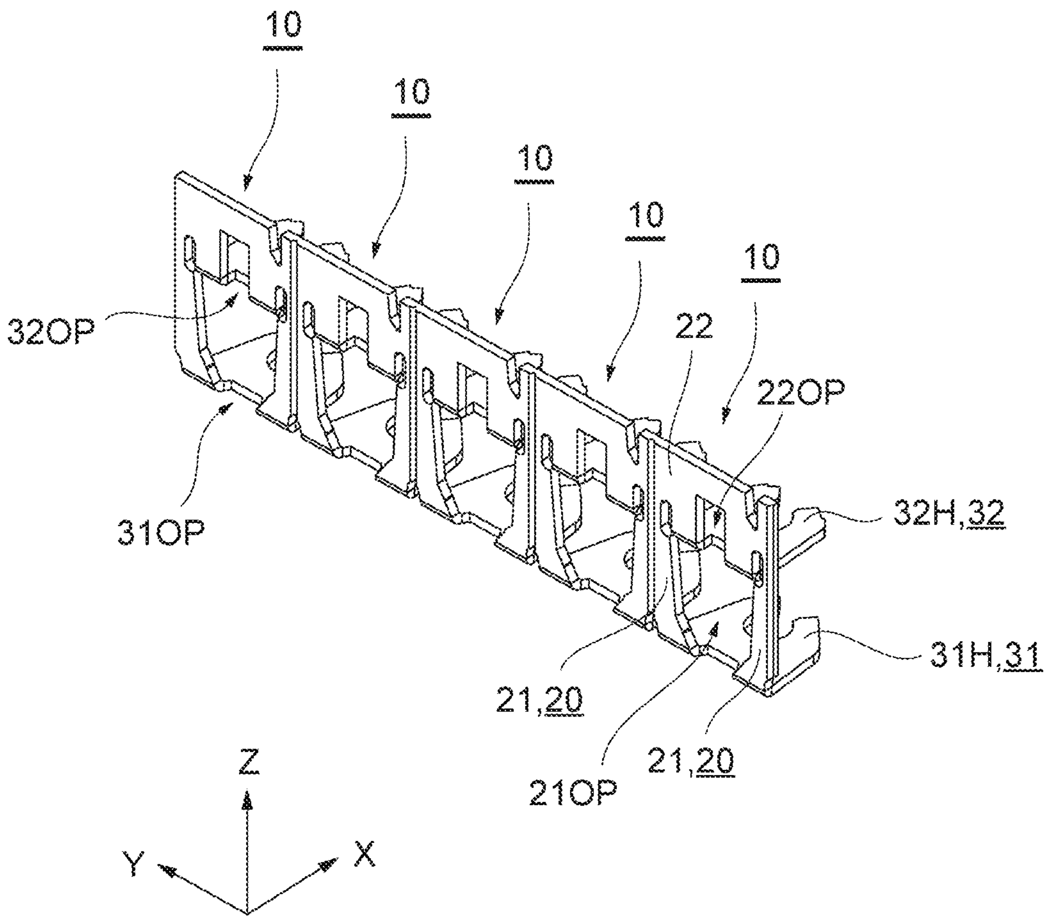
FIG. 2 is a perspective view of the fastener supports according to the illustrative embodiment of the present disclosure.
Figure 3:
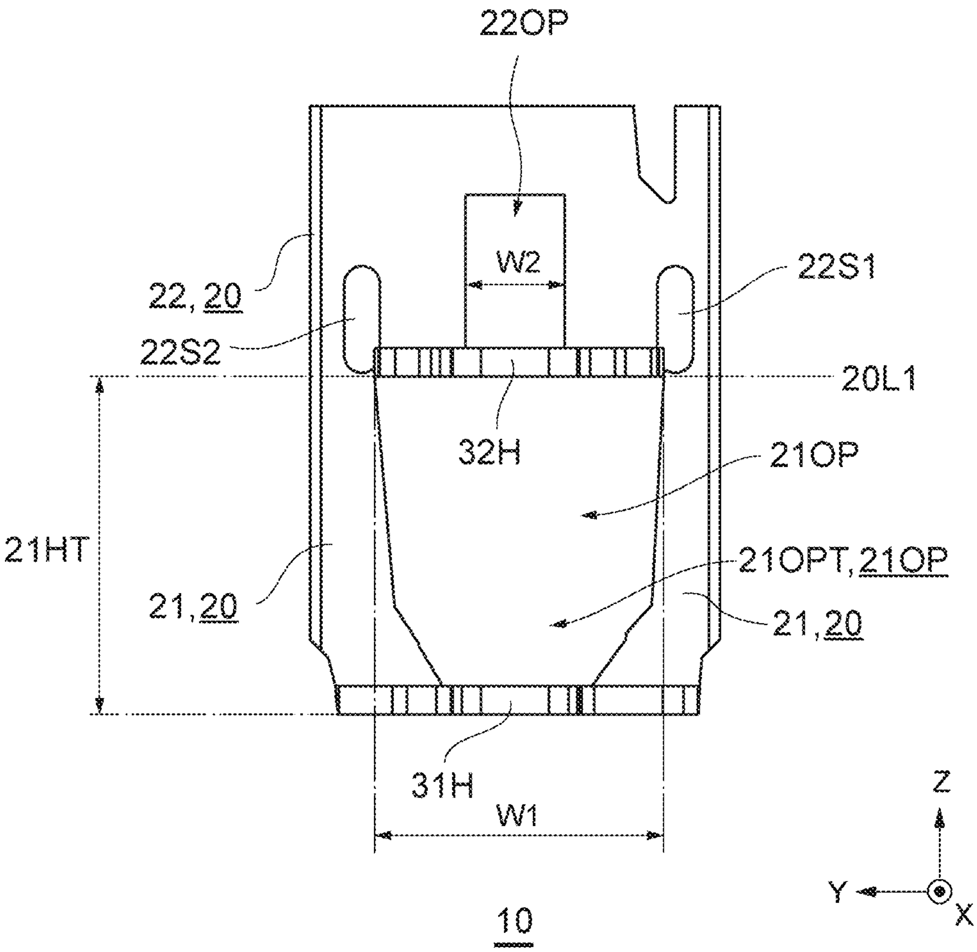
FIG. 3 is a rear view of the fastener support according to the illustrative embodiment of the present disclosure.
Figure 4A:
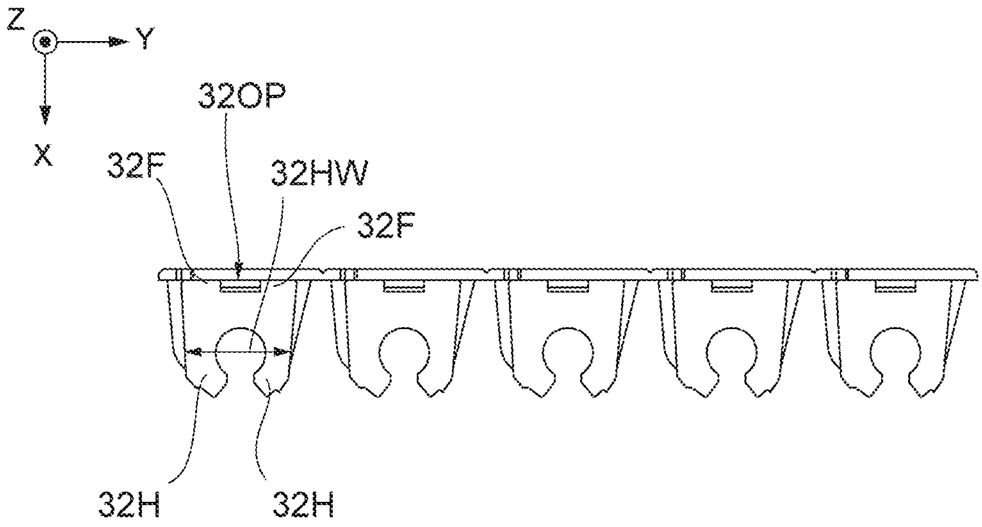
FIG. 4A is a plan view (top view) of the fastener supports according to the illustrative embodiment of the present disclosure.
Figure 4B:
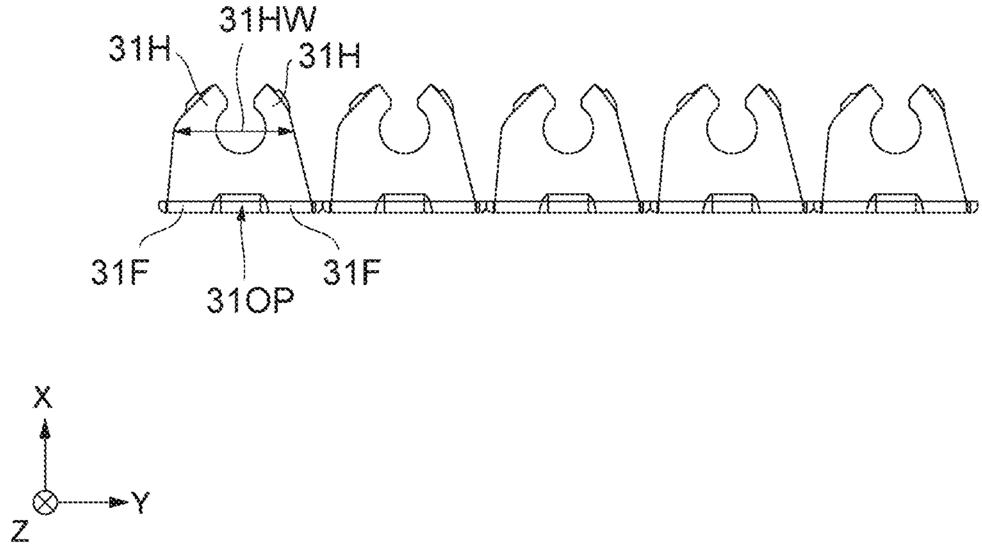
FIG. 4B is a bottom view (lower view) of the fastener supports according to the illustrative embodiment of the present disclosure.
Figure 5:
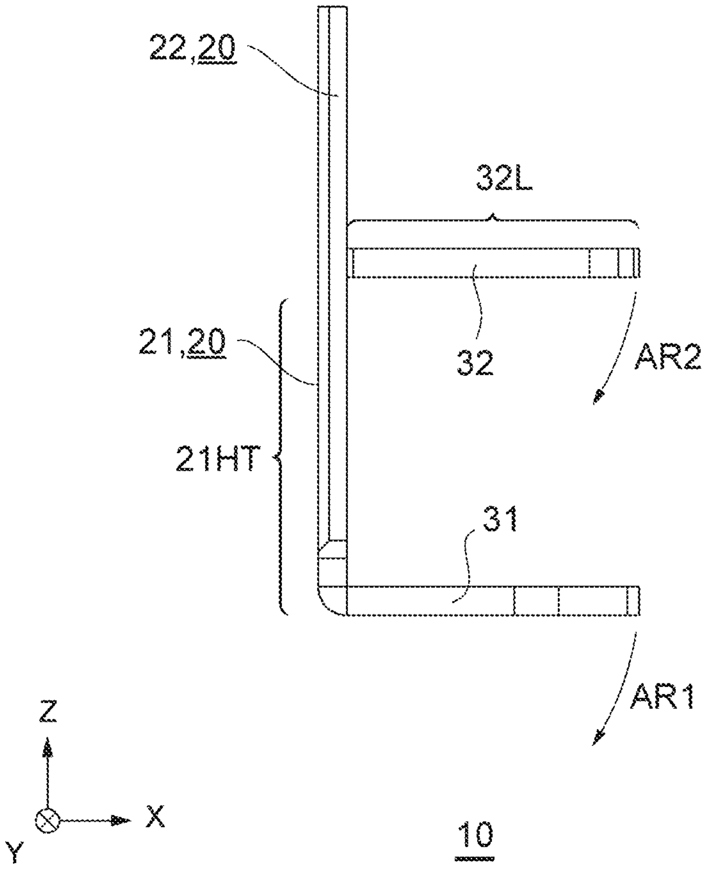
FIG. 5 is a side view of the fastener support according to the illustrative embodiment of the present disclosure.
Figure 8:
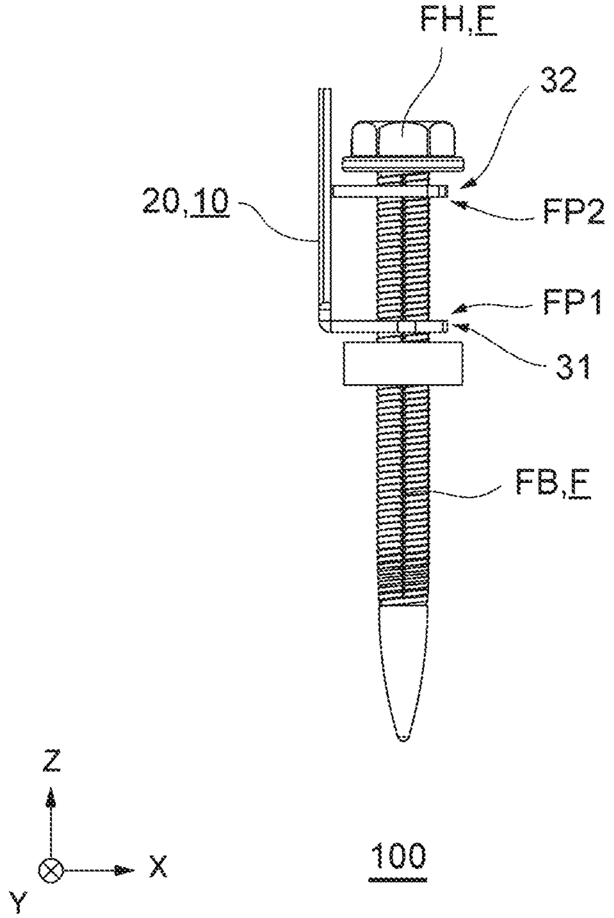
FIG. 8 is a side view of the coupled fastener according to the illustrative embodiment of the present disclosure.
Figure 9:
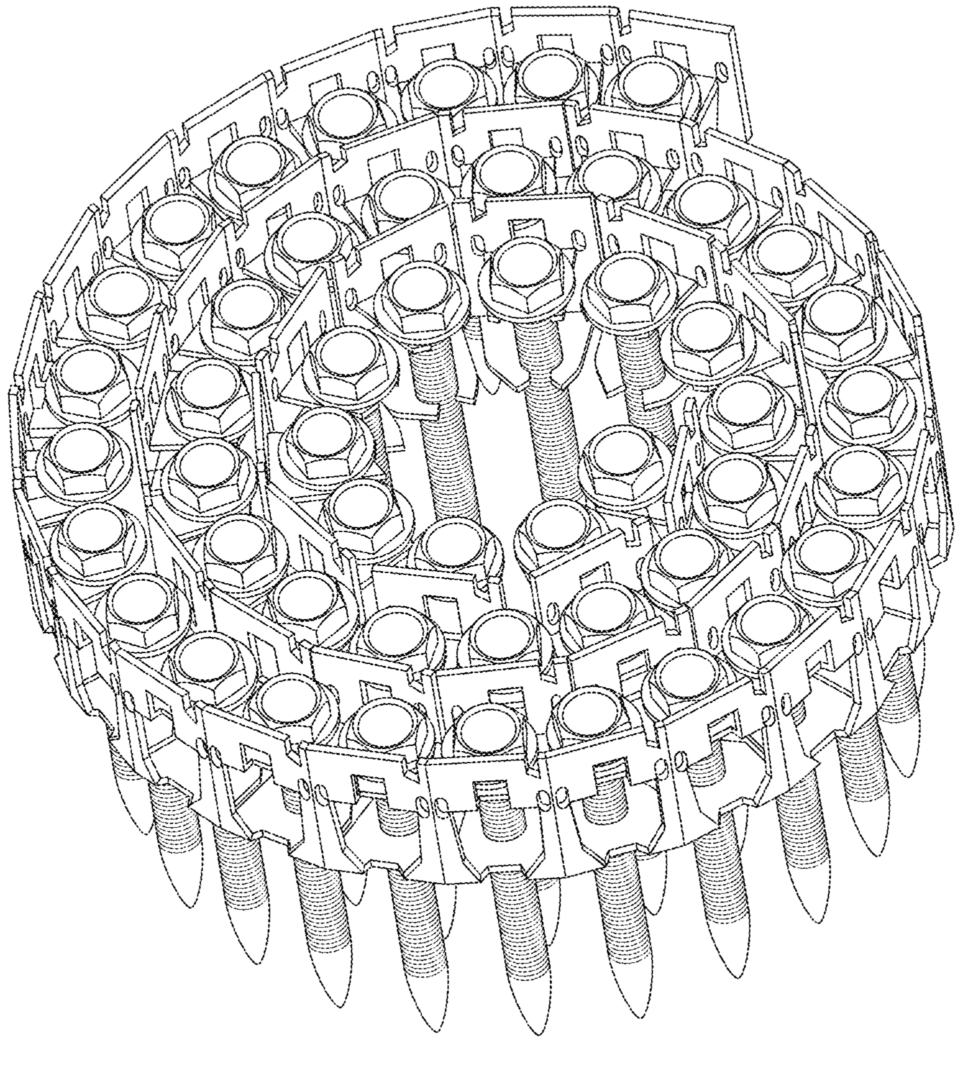
FIG. 9 is a perspective view of the coupled fastener according to the illustrative embodiment of the present disclosure.

FIGS. 1 and 2 are perspective views of fastener supports 10 according to the illustrative embodiment of the present disclosure as viewed from a front left side and a rear left side, respectively. FIG. 3 is a rear view of the fastener support 10 as viewed from a rear side; and FIGS. 4A, 4B, and 5 are a plan view of the fastener supports 10 as viewed from above, a bottom view as viewed from below, and a left side view as viewed the left, respectively. FIGS. 6, 7A, 7B, and 8 are a rear view of the fastener supports 10 supporting fasteners F as viewed from the rear side, a plan view as viewed from above, a bottom view as viewed from below, and a left side view as viewed from the left, respectively. FIG. 9 is a perspective view showing a coupled fastener 100 wound in a spiral shape.

For convenience, in this specification, a direction from a fastener body portion (which may also be referred to as "fastener shaft portion") FB to be described later toward a fastener head portion FH is referred to as upward, and conversely, a direction from the fastener head portion FH toward the fastener body portion FB is referred to as downward, and these directions may be collectively referred to as an upper-lower direction. Further, a direction from a plate-shaped member 20 (to be described later) of the fastener support 10 toward the fastener F is referred to as forward, and conversely, a direction from the fastener F toward the plate-shaped member 20 is referred to as rearward, and these directions may be collectively referred to as a front-rear direction. In addition, a direction toward the right as viewed from the front side is referred to as a rightward, a direction toward the left as viewed from the front side is referred to as a leftward, and these directions may be collectively referred to as a left-right direction or a width direction. These names are for showing a relative position relationship, and do not represent an absolute position relationship. As shown in FIG. 1 and the like, in the present illustrative embodiment, the upper-lower direction is indicated by a Z-axis, the front-rear direction is indicated by an X-axis, and the left-right direction (the width direction) is indicated by a Y-axis. The upper-lower direction, the front-rear direction, and the left-right direction (width direction) are perpendicular to each other.

As shown in FIG. 1 and the like, the fastener support 10 includes a first tab 31 and a second tab 32, both extending forward from the plate-shaped member 20. As shown in FIG. 8 and the like, by engaging the first tab 31 and the second tab 32 with the body portion FB of the fastener F, the fastener support 10 is configured to support a single type or a plurality of types of fasteners F.

As shown in FIG. 9 and the like, the plurality of fastener supports 10 that support the fasteners F are coupled in the left-right direction to form the coupled fastener 100. The coupled fastener 100 is loaded into a driving tool in a state of being wound in the spiral shape as shown in the same figure. When a driver of the driving tool strikes the head portion FH of the fastener F from above, the fastener F is separated from the fastener support 10, moves downward, and is driven into a workpiece. Hereinafter, a detailed configuration of the fastener support 10 according to the present illustrative embodiment will be described.

{Plate-Shaped Member}

The fastener support 10 includes a plate-shaped member 20 that supports the first tab 31 and the second tab 32. As shown in FIGS. 2 and 3, the plate-shaped member 20 includes a lower portion 21 (an example of a "first portion") and an upper portion 22 (an example of a "second portion"). The lower portion 21 corresponds to a lower portion of the plate-shaped member 20 and supports the first tab 31. The upper portion 22 corresponds to an upper portion of the plate-shaped member 20, is provided above the lower portion 21 continuously with the lower portion 21, and supports the second tab 32. FIG. 3 shows a virtual line 20L1 dividing the lower portion 21 and the upper portion 22.

{Lower Portion (First Portion)}

Figure 6:
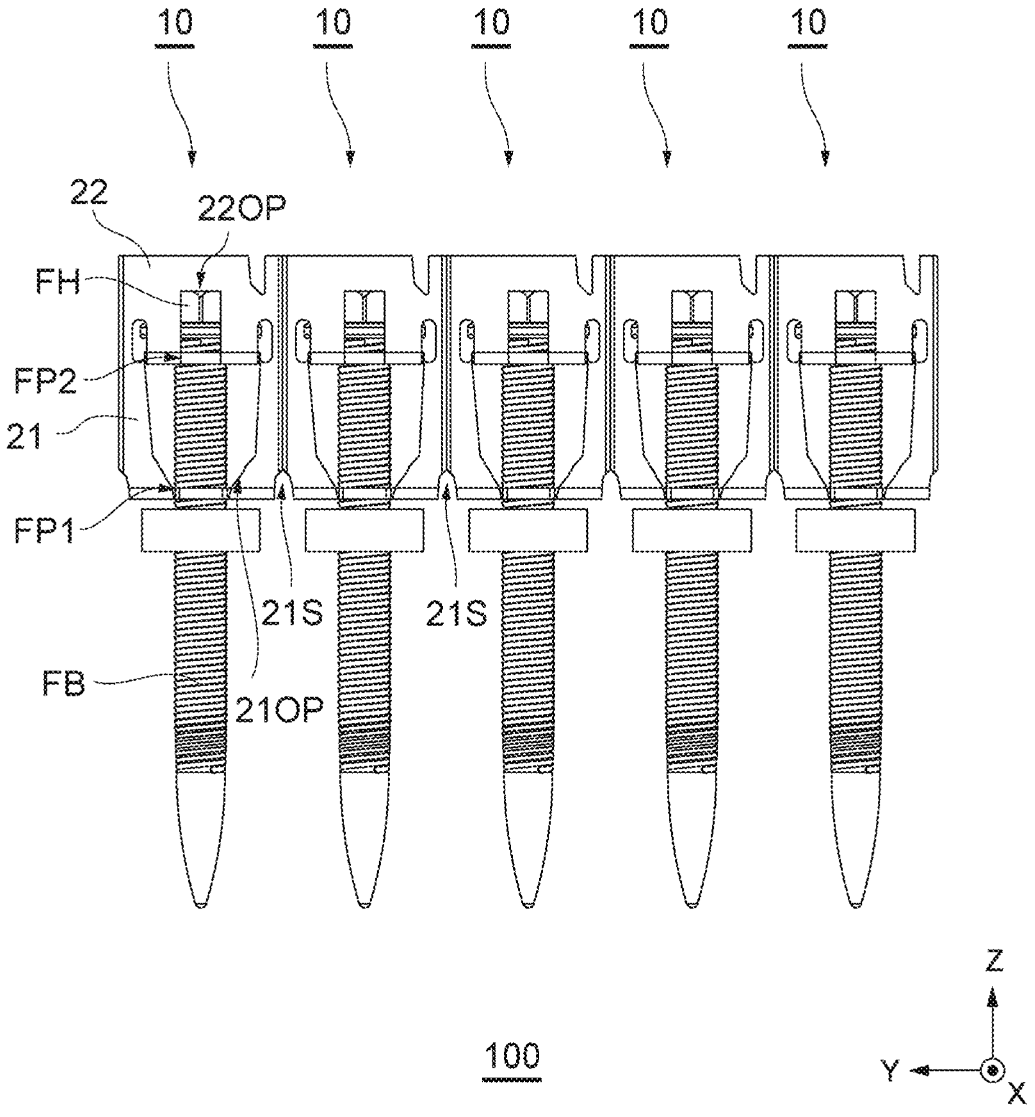
FIG. 6 is a rear view of a coupled fastener according to the illustrative embodiment of the present disclosure.
Figure 7A:
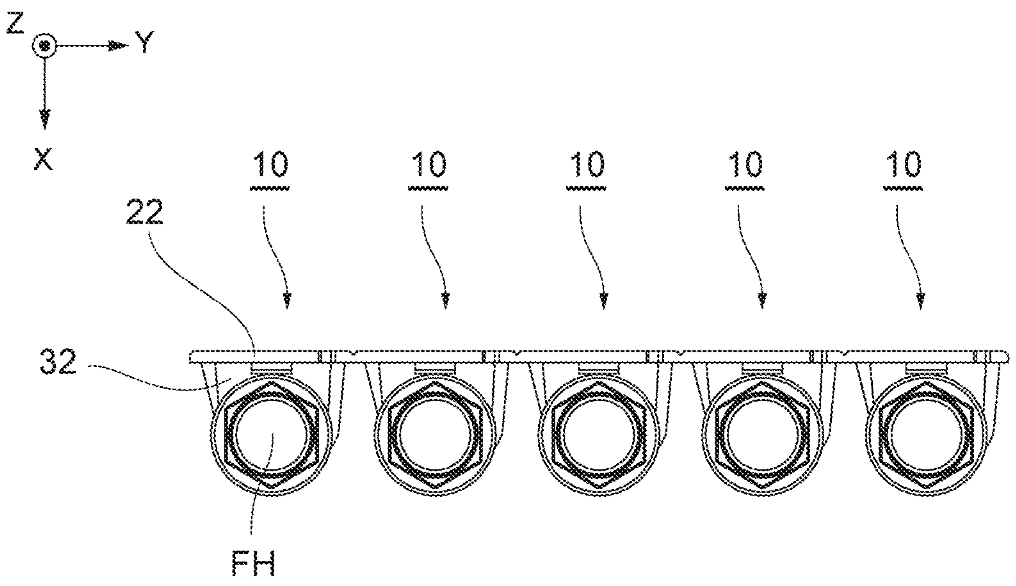
FIG. 7A is a plan view (top view) of the coupled fastener according to the illustrative embodiment of the present disclosure.
Figure 7B:
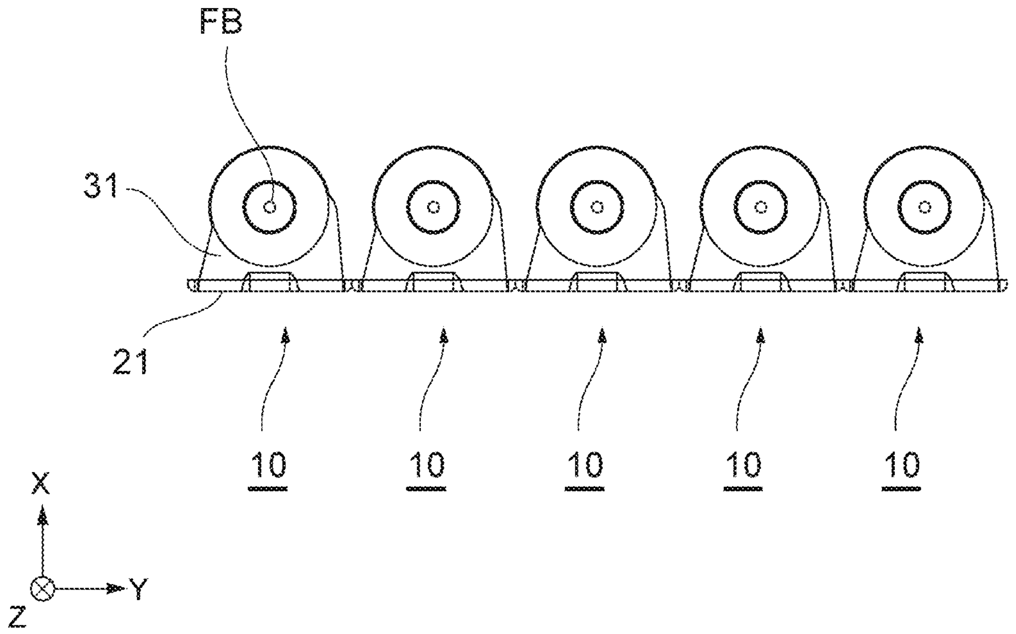
FIG. 7B is a bottom view (lower view) of the coupled fastener according to the illustrative embodiment of the present disclosure.

A first opening 21OP is formed in a central portion in a width direction of the lower portion 21 supporting the first tab 31. The first opening 21OP extends in the upper-lower direction so as to be connected to a lower end and an upper end of the lower portion 21. By providing the first opening 21OP, as shown in FIG. 6 which is the rear view, a user of the driving tool can visually recognize, from a rear direction, a portion from a position (which may be referred to as a "second support position FP2" or a "second fastener support position FP2" hereinafter) supported by a second support portion 32H of the second tab 32 in the fastener F of the coupled fastener 100 to a position (which may be referred to as a "first support position FP1" or a "first fastener support position FP1" hereinafter) supported by a first support portion 31H of the first tab 31.

The first opening 21OP is formed such that the second tab 32 can pass through when the second tab 32 (to be described later) rotates about a lower end of the upper portion 22 as a fulcrum (rotates in an arrow AR2 direction in FIG. 5). Therefore, as the fastener F is struck by the driver of the driving tool and moved downward, when a front end of the second tab 32 rotates about the lower end of the upper portion 22 as the fulcrum so as to approach the plate-shaped member 20, the second tab 32 collides with the first portion 21 and rotation thereof is hindered. As a result, inhibition of the downward movement of the fastener F is suppressed.

The first opening 21OP may be formed such that the second tab 32 cannot pass through in a state in which the first tab 31 is erected, and the second tab 32 can pass through when the first tab 31 rotates (for example, a state in which the first tab 31 rotates and becomes parallel to the lower portion 21).

As shown in FIG. 3 and the like, the first opening 21OP in the present illustrative embodiment is formed to have a maximum width W1 in the width direction. As shown in the same figure, the maximum width W1 of the first opening 21OP is larger than a maximum width W2 of a second opening 22OP (to be described later), and is preferably twice the maximum width W2.

By forming the first opening 21OP wider than the second opening 22OP in this way, it is possible to reduce a risk of the fastener head portion FH of the fastener F getting caught by the fastener support 10, which could inhibit the downward progression of the fastener F, and to stabilize a posture of the fastener F. In addition, since the first opening 21OP is formed to be wide, visibility of the body portion FB of the fastener F is also improved.

The first opening 21OP according to the present illustrative embodiment is further formed to have an opening 21OPT having a larger width toward an upper side. In other words, the width of the opening 21OPT decreases toward a lower side, and the opening 21OPT may be referred to as a tapered opening.

By forming the first opening 21OP including a portion of which the width increases toward the upper side in this way, in other words, the portion of which the width decreases toward the lower side, it is possible to realize a configuration in which the fastener head portion FH is less likely to be caught by the fastener support 10 by ensuring an opening in a central portion in the width direction of the plate-shaped member 20, with which the fastener head portion FH most easily comes into contact. When the fastener support 10 supports the fastener F having the large fastener head portion FH, for example, the fastener F may move downward while a boundary edge of a polygonal shape or a circular shape formed by side surfaces of the fastener head portion FH and a bottom surface facing downward is in contact with an opening edge of the first opening 21OP. At this time, since the width of the opening 21OPT decreases toward the lower side, it is possible to promote the movement of the fastener F in a direction away from the plate-shaped member 20 as it moves downward.

The opening 21OPT in the present illustrative embodiment is formed in a tapered shape having a linear opening edge, but is not limited thereto. For example, an opening having an opening edge formed of a curved line such as a round shape may be formed as the portion of which the width increases toward the upper side.

The opening 21OPT may be formed in the entire first opening 21OP or may be formed in a part (for example, only an upper end portion or only a lower end portion of the first opening 21OP). When the opening 21OPT is formed only in the lower end portion of the first opening 21OP, the width of a portion provided on an upper side of the opening 21OPT may be constant. {Upper Portion (Second Portion)}

A second opening 22OP is formed at a central portion in the width direction of the upper portion 22 that supports the second tab 32 in the lower end of the upper portion 22 (that is, an upper end of the lower portion 21). The second opening 22OP extends in the upper-lower direction so as to be coupled to a central portion in the width direction of an upper end of the first opening 21OP. By providing the second opening 22OP, as shown in FIG. 6, the user of the driving tool can visually recognize, from the rear direction, a portion from the second support position FP2 supported by the support portion 32H of the second tab 32 in the fastener F of the coupled fastener 100 to at least a portion of the fastener head portion FH.

As shown in FIG. 3 and the like, the second opening 22OP in the present illustrative embodiment is formed to have the maximum width W2 in the width direction. As shown in the same figure, the maximum width W2 of the second opening 22OP is smaller than the maximum width W1 of the first opening 21OP. A height of the second opening 22OP in the upper-lower direction is smaller than a height of the first opening 21OP in the upper-lower direction. In addition, unlike the first opening 21OP including the portion (opening 21OPT) of which the width increases toward the upper side, the width of the second opening 22OP is constant in the upper-lower direction. However, the second opening 22OP may be formed such that the width varies in the upper-lower direction (for example, to have a tapered shape).

Unlike the first opening 21OP through which the second tab 32 may pass when striking, the width of the second opening 22OP may be smaller than that of the first opening 21OP because a tab does not pass through the second opening 22OP, and the second opening 22OP is formed to have a minimum width and a minimum height for ensuring visibility from a rear surface of the fastener F. Here, when a head portion diameter of the fastener head portion FH is large, by forming the second opening 22OP such that the height of the second opening 22OP becomes larger than the height of the fastener head portion FH, the fastener support 10 may support the fastener F such that a part of the fastener head portion FH enters the second opening 22OP, and further, a part of the fastener head portion FH projects rearward from the second opening 22OP. According to such a configuration, since it is possible to suppress a distance between the fastener support 10 and the fastener F, it is possible to promote the reduction in the diameter of the coupled fastener 100 wound in the spiral shape.

With this configuration, it is possible to ensure the height of the upper portion 22 above the second opening 22OP, and it is also possible to make the width of a portion of the upper portion 22 connected to the second tab 32 relatively wider, thereby suppressing deformation of the second tab 32 when supporting the fastener F. However, the second opening 22OP may be formed to vary in a dimension in the width direction, or may be formed to vary in a dimension in the height direction.

The upper portion 22 according to the present illustrative embodiment further has a first slit 22S1 and a second slit 22S2. The first slit 22S1 is an opening connected to one end portion in the width direction of the upper end of the first opening 21OP. The second slit 22S2 is an opening connected to the other end portion in the width direction of the upper end of the first opening 21OP. The first slit 22S1 and the second slit 22S2 are each formed to extend in the upper-lower direction. Further, the first slit 22S1 (second slit 22S2) and the first opening 21OP are connected by forming a cut that connects the two in the upper portion 22. Therefore, the first slit 22S1 (second slit 22S2) has an extremely small width at a lower end, and is formed to be relatively wide at an upper portion. The second slit 22S2 is formed symmetrically with the first slit 22S1, so that a detailed description thereof is omitted. However, the second slit 22S2 may not necessarily be formed symmetrically with the first slit 22S1 and may be formed in a shape different from that of the first slit 22S1. For example, the cut connected to the first opening 21OP of the second slit 22S2 may have a shape different from that of the cut connected to the first opening 21OP of the first slit 22S1.

As a result of this configuration, the first opening 21OP is connected to the second opening 22OP at the central portion of the upper end, is connected to the first slit 22S1 at one end portion in the width direction of the upper end, and is connected to the second slit 22S2 at the other end portion in the width direction of the upper end.

With such a configuration, the first slit 22S1 is formed between a portion of the upper portion 22 connected to the second tab 32 (a portion between the second opening 22OP and the first slit 22S1 in FIG. 3) and a portion connected to the first tab 31 (a portion rightward of the first slit 22S1 in FIG. 3) (via the lower portion 21). Similarly, the second slit 22S2 is formed between a portion of the upper portion 22 connected to the second tab 32 (a portion between the second opening 22OP and the second slit 22S2 in FIG. 3) and a portion connected to the first tab 31 (a portion leftward of the second slit 22S2 in FIG. 3) (via the lower portion 21). Therefore, as the fastener F is struck by the driver of the driving tool and moved downward, it is possible to promote the rotation (rotation in the direction of an arrow AR2 in FIG. 5) such that the front end of the second tab 32 approaches the plate-shaped member 20. For example, by increasing the width or the like of the first slit 22S1, the portion connected to the second tab 32 may rotate together with the second tab 32. With this configuration, the second tab 32 can be easily retracted from an injection path.

As described above, according to the plate-shaped member 20 of the present illustrative embodiment, the first tab 31 that is a lower tab is supported at the lower portion 21 that is the lower portion and the second tab 32 that is an upper tab is supported at the upper portion 22 that is the upper portion. In this configuration, the first opening 21OP that reaches the lower end from the upper end of the lower portion 21 is formed at the central portion in the width direction of the lower portion 21, and the second opening 22OP that is connected to (continuous with) the first opening 21OP is formed at the central portion in the width direction of the upper portion 22. For this reason, in the central portion in the width direction of the plate-shaped member 20, which is closest to a region through which the fastener head portion FH moving downward passes, a large opening is formed. This opening has the first opening 21OP, which is connected to the lower end of the lower portion 21 and extends upward from the lower end, and the second opening 22OP, which is continuous with the first opening 21OP and extends further upward. As a result, an obstacle that inhibits the movement of the fastener F is not present in a course of the fastener head portion FH. Thus, it is possible to drive the fastener F without disturbing the posture as compared to the related art. Therefore, it is possible to suppress a driving failure in which the fastener F is driven into a driven member which is the workpiece in an inclined state.

Figure 10A:
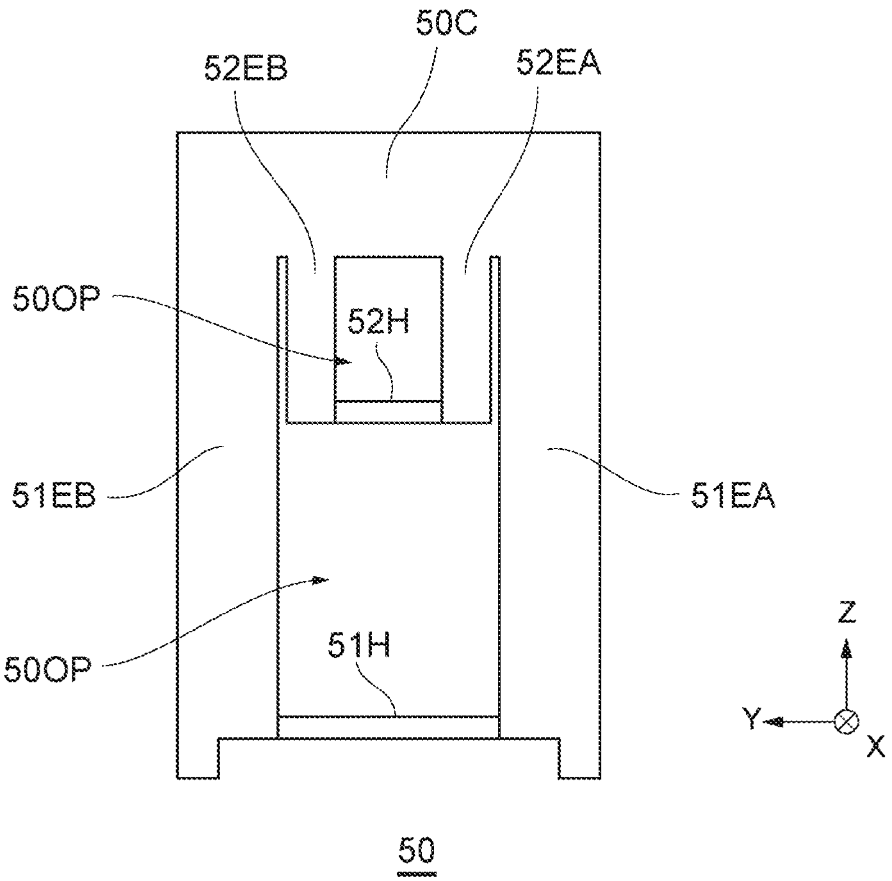
FIG. 10A is a schematic view (rear view) of a fastener support according to an illustrative embodiment of the present disclosure.

A lower end of the plate-shaped member 20, that is, a position of the lower end of the lower portion 21 in the upper-lower direction (corresponding to a coordinate of the Z axis) may be constant along the width direction (corresponding to a coordinate of the Y axis) as shown in FIG. 3, or may not be constant (unlike FIG. 3) and be vary according to a position in the width direction. For example, by deforming the shape of the lower portion 21 of FIG. 3, the lower portion 21 may be formed such that the lower end of the lower portion 21 which is located at one end portion or both end portions in the width direction projects below the lower end of the central portion in the width direction of the lower portion 21 (FIG. 10A). Even in such a shape, since the first opening 21OP connected to a lower end of the central portion and extending upward is formed in the lower portion 21, it is possible to exert an effect of suppressing the fastener F from getting caught by the fastener support 10.

{First Tab}

The fastener support 10 includes the first tab 31 and the second tab 32 that detachably support the fastener F. The tabs are configured to support the fastener F in front of the plate-shaped member 20 by being erected forward from the plate-shaped member 20, which is an example of a member extending in a two-dimensional direction (YZ plane direction) in the upper-lower direction and the left-right direction. As shown in FIG. 5 which is the left side view, in the side view, the first tab 31 is erected forward from the lower end (the lower end of the lower portion 21) of the plate-shaped member 20. Since the lower end of the lower portion 21 also corresponds to the lower end of the plate-shaped member 20, the first tab 31 can also be said to be erected forward from the lower end of the plate-shaped member 20. However, the first tab 31 may be erected forward so as to be slightly inclined with respect to the plate-shaped member 20. For example, the first tab 31 may be erected forward so as to be slightly inclined downward with respect to the plate-shaped member 20. At this time, the second tab 32 may be erected forward so as to be slightly inclined upward with respect to the plate-shaped member in order to support the fastener F.

As shown in FIG. 1 and the like, the first tab 31 includes the first support portion 31H that supports the first support position FP1 (FIG. 8) of the fastener body portion FB, and a pair of first leg portions 31F that connect the lower portion 21 to the first tab 31 by being erected from the lower portion 21 with the first opening 21OP interposed therebetween.

As shown in the same figure and the like, a front end of the first support portion 31H of the present illustrative embodiment has a pair of portions extending in an arm shape (which may be referred to as "arm portions") where inner wall surfaces having an arc shape or a cylindrical surface shape are formed so as to respectively support a side surface facing a left side and a side surface facing a right side of the fastener body portion FB having a circular cross section.

Further, an opening communicating with the inner wall surfaces of the pair of arm portions is formed at a front end of the first tab 31 (the front end of the first support portion 31H).

When the fastener F rotates about the vicinity of the lower end of the lower portion 21 as a fulcrum such that the front end of the first tab 31 approaches the plate-shaped member as the fastener F moves downward, the fastener F is configured to pass through the opening and be separable from the fastener support 10.

When the first support portion 31H supports the fastener F, a width 31HW (FIG. 4B) of the first support portion 31H in the width direction (the direction perpendicular to the upper-lower direction and the front-rear direction) at a position passing through a central axis of the fastener F is formed to be larger than a width 32HW (FIG. 4A) of the second support portion 32H in the width direction at a position passing through the central axis of the fastener F to be described later.

By setting the width 31HW of the first support portion 31H of the first tab 31 provided on the lower side to be larger than the width 32HW of the second support portion 32H of the second tab 32 provided on the upper side in this way, it is possible to increase a fastener holding force of the lower tab from which the fastener F is easily detached. Thus, it is possible to suppress poor driving caused by coming off of a nail, which may cause the fastener F to come off, and malfunction of the driving tool.

A rear end (X-axis negative direction end portion) of the first support portion 31H is connected to the pair of first leg portions 31F. Since the pair of first leg portions 31F are erected from the lower portion 21 with the first opening 21OP therebetween, as shown in FIG. 4B, a space (gap) in which no member is present is provided between a central portion in the width direction of the rear end of the first support portion 31H and the plate-shaped member 20. That is, an opening 31OP formed to penetrate the first tab 31 in the upper-lower direction is formed between the pair of first leg portions 31F of the first tab 31 (the first opening 21OP corresponds to an opening formed so as to penetrate the plate-shaped member 20 in the front-rear direction).

A shape of the opening 31OP can be determined according to a shape of the pair of first leg portions 31F. In the present illustrative embodiment, the pair of first leg portions 31F is formed such that a width thereof increases as a distance from the lower portion 21 increases. An interval between the pair of first leg portions 31F decreases as approaching the first support portion 31H. As a result, the opening 31OP formed between the pair of first leg portions 31F of the first tab 31 is formed such that a width thereof increases as the opening 31OP approaches the lower portion 21 (toward the rear side) when viewed from above.

According to the above configuration, compared to a case where the opening 31OP is not formed and the member is provided, it is possible to reduce the possibility of the fastener head portion FH (particularly, the fastener head portion FH of the fastener F of a type having a large head portion) getting caught by the first tab 31. As a result, since the necessity of supporting the fastener F at a position largely separated from the plate-shaped member 20 in front is reduced, it is possible to contribute to a reduction in diameter when the coupled fastener 100 is wound in the spiral shape.

In addition, compared to the configuration in which the tab is held by only one leg portion, since a rotation direction of the first tab 31 can be stabilized by providing the pair of first leg portions 31F, it is possible to stabilize a movement direction of the fastener F descending while in contact with the first tab 31.

Further, by forming the opening 31OP, when the front end of the second tab 32 rotates about the lower end of the upper portion 22 as the fulcrum so as to approach the plate-shaped member 20, a gap can be formed between the front end of the second tab 32 and the rear end of the first support portion 31H. Thus, it is also possible to reduce the possibility that the second tab 32 collides with the first tab 31 or the like and rotation thereof is hindered.

In addition, in the present illustrative embodiment, the opening 31OP is formed such that the width of the opening 31OP increases as the opening 31OP approaches the lower portion 21 (toward the rear side), in other words, the width decreases as the opening 31OP is separated from the lower portion 21 (toward the front side). Here, the opening 31OP may be formed in a tapered shape but it is not limited thereto, and may be formed in a round shape (curved shape), for example.

When the fastener support 10 supports the fastener F having the large fastener head portion FH, for example, the fastener F may move downward while the boundary edge of the polygonal shape or the circular shape formed by the side surfaces of the fastener head portion FH and the bottom surface facing downward is in contact with an opening edge of the opening 31OP. At this time, as a result of the rotation of the first tab 31, the width of the opening 31OP decreases toward the lower side, and thus it is possible to promote the downward movement of the fastener F while tilting the first tab 31 in a direction approaching the plate-shaped member 20.

{Second Tab}

As shown in FIG. 1 and the like, the second tab 32 includes the second support portion 32H and a pair of second leg portions 32F. The second support portion 32H supports the second support position FP2 (FIG. 8) above the first support position FP1 of the fastener body portion FB. The pair of second leg portions 32F connect the upper portion 22 to the second tab 32 by being erected from the upper portion 22 with the second opening 22OP interposed therebetween. As shown in a side view of FIG. 5, the second tab 32 is erected forward from the lower end of the upper portion 22. However, similarly to the first tab 31, the second tab 32 may be erected forward so as to be slightly inclined with respect to the plate-shaped member 20. For example, when the fastener F having a weight is supported, the second tab 32 may be erected forward so as to be inclined slightly downward with respect to the upper portion 22 (plate-shaped member 20). At this time, the first tab 31 may be erected forward so as to be inclined slightly upward with respect to the plate-shaped member 20 in order to support the fastener F.

As shown in FIG. 1 and the like, similarly to the first tab 31, a front end of the second support portion 32H of the second tab has a pair of portions extending in an arm shape (which may be referred to as "arm portions") where inner wall surfaces having an arc shape or a cylindrical surface shape are formed so as to respectively support the side surface facing the left side and the side surface facing the right side of the fastener body portion FB having the circular cross section. An opening communicating with the inner wall surfaces of the pair of arm portions is further formed at the front end of the second support portion 32H, and when the fastener F rotates about the vicinity of the lower end of the upper portion 22 as a fulcrum so that the front end of the second tab 32 approaches the plate-shaped member 20 as the fastener F moves downward, the fastener F is configured to pass through the opening and be separable from the fastener support 10.

As previously mentioned, when the second support portion 32H supports the fastener F, the width 32HW (FIG. 4A) of the second support portion 32H in the width direction (the direction perpendicular to the upper-lower direction and the front-rear direction) at a position passing through the central axis of the fastener F is formed smaller than the width 31HW (FIG. 4B) of the first support portion 31H described above. In this way, by making the width 31HW of the first support portion 31H, which is located below, larger than the width 32HW of the second support portion 32H, which is located above, it is possible to increase the fastener holding force of the lower tab, which is where the fastener F is likely to detach.

Similarly to the first support portion 31H, a rear end (X-axis negative direction end portion) of the second support portion 32H is connected to the pair of second leg portions 32F. Since the pair of second leg portions 32F stand erect from the lower end of the upper portion 22, with the second opening 22OP in between, a space (or gap) where no member is present is created between a central part in the width direction of the rear end of the second support portion 32H and the plate-shaped member 20, as shown in FIG. 4A. In other words, an opening 32OP, which is formed to penetrate the second tab 32 in the upper-lower direction (or vertical direction), is formed between the pair of second leg portions 32F of the second tab 32.

A shape of the opening 32OP can be determined according to a shape of the pair of second leg portions 32F, similar to the opening 31OP. When viewed from above, the opening 32OP may be formed such that a width thereof increases as approaching the second portion 22 (toward the rear side), similarly to the opening 31OP. In other words, the opening 32OP may be formed such that the width thereof decreases as the opening 32OP approaches the support portion 32H (toward the front side).

According to such a configuration, it becomes easier to rotate the second tab 32, thereby suppressing the movement of the faster F from being obstructed by the second tab 32.

According to the above configuration, it is possible to reduce the possibility of the fastener head portion FH getting caught by the second tab 32, compared to a case where the opening 32OP is not formed and the member is present. Consequently, the need to support the fastener F at a position largely separated from the plate-shaped member 20 is reduced. This can contribute to a reduction in diameter when the coupled fastener 100 is wound in the spiral shape.

A length 32L (FIG. 5) of the second tab 32 in the front-rear direction may be greater than a height 21HT (same figure) of the lower portion 21 in the upper-lower direction.

With such a configuration, when the second tab 32 rotates about the lower end of the upper portion 22 as the fulcrum and aligns parallel to the plate-shaped member 20, the lower end of the second tab 32 is positioned lower than the lower end of the lower portion 21. Therefore, compared to the case where the length of the tab corresponding to the second tab in the front-rear direction is shorter than the height of the portion corresponding to the lower portion in the upper-lower direction, it is possible to reduce the height of the plate-shaped member 20 in the upper-lower direction. By reducing the dimension (or height) of the fastener support 10 in the upper-lower direction, it becomes possible to adequately support the short fastener F.

According to the fastener support 10 as described above, as shown in FIG. 6 which is the rear view, the portion from at least the portion of the fastener head portion FH of the fastener F to the second support position FP2 can be visually recognized from the rear via the second opening 22OP, the portion from the second support position FP2 of the fastener F to the first support position FP1 can be visually recognized from the rear via the first opening 21OP, and since the first opening 21OP is connected to at least the lower end of the central portion of the plate-shaped member 20, the portion from the first support position FP1 of the fastener F projecting below the plate-shaped member 20 to a lower end of the fastener F can also be visually recognized from the rear.

In other words, according to the fastener support 10, it becomes possible to visually recognize from the rear almost all or the entire portion of the fastener F, from at least a part of the fastener head portion FH of the fastener F to the lower end of the fastener F. Therefore, as shown in FIG. 9, when the fasteners F are wound in the spiral shape in a position relationship in which the fasteners F are positioned on an inner side with respect to the fastener supports 10 that support the fasteners F, the user of the driving tool can easily identify the type of the fasteners F.

Further, the first opening 21OP is formed in the central portion in the width direction of the lower portion 21 of the plate-shaped member 20, extending from the lower end to the upper end of the lower portion 21, and the second opening 22OP connected to (continuous with) the first opening 21OP is formed in the central portion in the width direction of the upper portion 22. Therefore, in the central portion in the width direction of the plate-shaped member 20, which is closest to the region through which the fastener head portion FH moving downward passes, an opening is formed that reaches the lower end of the plate-shaped member 20 from a height equivalent to the fastener head portion FH of the fastener F. Therefore, it is possible to suppress the fastener F from being caught by the fastener support 10.

Further, as will be described later with reference to FIG. 13B, an engaging claw (check claw) extending in the upper-lower direction of the driving tool can enter the second opening 22OP, a region between the pair of second leg portions 32F, the first opening 21OP, and a region between the pair of first leg portions 31F. Therefore, when a feeding claw (to be described later) moves in a direction opposite to a feeding direction in order to feed the next fastener F, it is also possible to restrict the movement of the coupled fastener 100 such that even the coupled fastener 100 does not move in the opposite direction.

Further, as shown in the plan view (FIG. 4A) and the bottom view (FIG. 4B), the opening 32OP separating the second tab 32 and the plate-shaped member 20 is formed in the central portion in the width direction, and the opening 31OP separating the first tab 31 and the plate-shaped member 20 is formed in the central portion in the width direction, making it possible to reduce the possibility of the fastener F (especially a type of fastener F having the large fastener head portion FH) getting caught on the fastener support 10 compared to when a member is present in this portion. In addition, it is also possible to promote the rotation of the second tab 32 and the first tab 31, so that it is possible to suppress excessive inhibition of the downward movement of the fastener F. In order to promote the rotation of the second tab 32 and the first tab 31, a cut may be formed so that each connection portion between the second tab 32 and the first tab 31 and the plate-shaped member 20 and a part of the member of at least one of the connection portions are removed to make the member thin.

In other words, the fastener support 10 described above can also be said to include the connection portions extending in the width direction and four extending portions connected to the member. Here, the connection portion is provided at the upper end portion of the upper portion 22 and corresponds to a member extending in the width direction. As shown in FIG. 6 and the like, the connection portion may not necessarily have a rectangular shape as long as the connection portion is formed to connect the extending portions to each other.

A pair of first extending portions are members coupled to the first tab 31. The first extending portions are connected to the connection portion, and includes one first extending portion extending downward from one end portion in the width direction of the connection portion (which may be referred to as "one end portion in the width direction", Y-axis negative direction end portion), and the other first extending portion extending downward from the other end portion in the width direction of the connection portion (which may be referred to as "the other end portion in the width direction", Y-axis positive direction end portion). One of the first extending portions corresponds to a member that extends downward at the right end of the upper portion 22 of the plate-shaped member 20 in FIGS. 3 and 6, extends downward at the right end of the lower portion 21, and is connected to the first tab 31. The other of the first extending portions corresponds to a member that extends downward at the left end of the upper portion 22 of the plate-shaped member 20 in FIGS. 3 and 6, extends downward at the left end of the lower portion 21, and is connected to the first tab 31.

The fastener support 10 further includes one first leg portion 31F erected forward from the one first extending portion and the other first leg portion 31F erected forward from the other first extending portion. The fastener support 10 includes the first support portion 31H that connects the pair of first leg portions 31F to each other and supports the first support position FP1 of the fastener F in front of the pair of first extending portions.

A pair of second extending portions are members connected to the second tab 32. The second extending portion has a length shorter than that of the first extending portion. One of the second extending portions is formed between the pair of first extending portions so as to extend downward from the connection portion at a position adjacent to the one of the first extending portions corresponding to a right end (in the Y-axis negative direction end portion) of FIG. 3. The one of the first extending portions and the one of the second extending portions are divided by the first slit 22S1. The other of the second extending portions is formed between the pair of first extending portions so as to extend downward from the connection portion at a position adjacent to the other of the first extending portions corresponding to a left end (the Y-axis positive direction end portion) of FIG. 3. The other of the first extending portions and the other of the second extending portions are divided by the second slit 22S2. The second opening 22OP is formed between the pair of second extending portions.

The fastener support 10 further includes the one of the second leg portions 32F erected forward from the one of the second extending portions, and the other of the second leg portions 32F erected forward from the other of the second extending portions. The fastener support 10 is provided with the second support portion 32H that connects the pair of second leg portions 32F to each other and supports the second support position FP2 above the first support position FP1 of the fastener F in front of the pair of second extending portions.

Effects similar to those described above are exerted in the fastener support 10 expressed in this way.

Figure 10B:
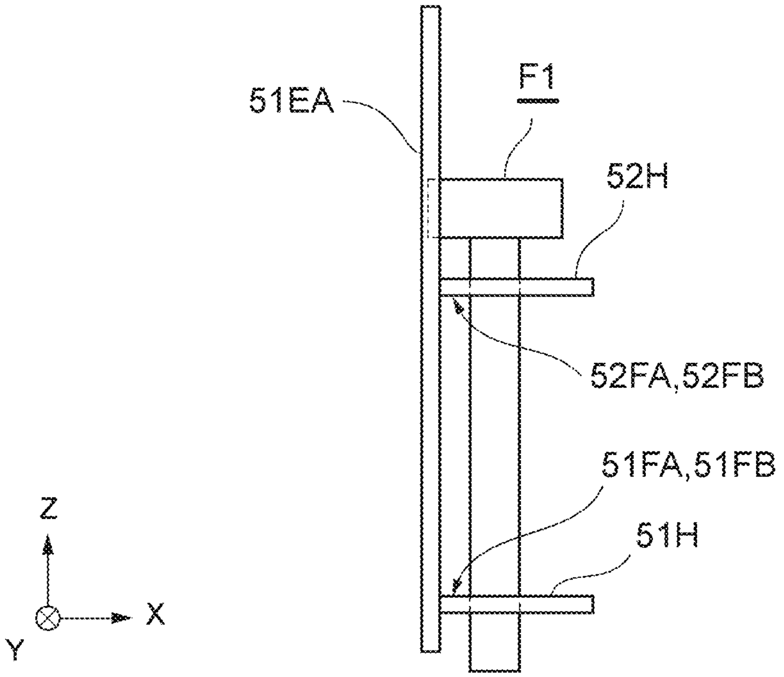
FIG. 10B is a schematic view (side view) of the fastener support according to the illustrative embodiment of the present disclosure.

FIGS. 10A and 10B are a rear view and a left side view schematically showing a fastener support 50 according to a modification of the fastener support 10. As shown in the same figures, the fastener support 50 supports a fastener F1 (however, in order to facilitate understanding of the configuration of the fastener support 50, the fastener F1 is not shown in FIG. 10A which is the rear view).

The fastener support 50 includes: a connection portion 50C extending in the width direction; one first extending portion 51EA extending downward from one end portion in the width direction of the connection portion 50C; the other first extending portion 51EB extending downward from the other end portion in the width direction; one first leg portion 51FA extending forward from the one first extending portion 51EA; the other first leg portion 51FB erected forward from the other first extending portion 51EB; a first support portion 51H connecting the pair of first leg portion 51FA and first leg portion 51FB to each other and supporting a first position of the fastener F1 in front of the pair of first extending portion 51EA and first extending portion 51EB; one second extending portion 52EA having a length shorter than that of the pair of first extending portion 51EA and first extending portion 51EB, provided between the pair of first extending portion 51EA and first extending portion 51EB, and extending downward from the connection portion 50C at a position adjacent to the one first extending portion 51EA; the other second extending portion 52EB having a length shorter than that of the pair of first extending portion 51EA and first extending portion 51EB, provided between the pair of first extending portion 51EA and first extending portion 51EB, and extending downward from the connection portion 50C at a position adjacent to the other first extending portion 51EB; one second leg portion 52FA erected forward from the one second extending portion 52EA; the other second leg portion 52FB erected forward from the other second extending portion 52EB; and a second support portion 52H connecting the pair of second leg portion 52FA and second leg portion 52FB to each other and supporting a second position above the first position of the fastener F1 in front of the pair of second extending portion 52EA and second extending portion 52EB.

At this time, an opening 50OP that is connected to the lower end of the central portion of the fastener support 50 and penetrates the fastener support 10 in the front-rear direction is formed in the pair of second extending portions 52EA and second extending portions 52EB between the pair of first extending portions 51EA and first extending portions 51EB. Since the opening 50OP is formed, the user can visually recognize, from a rear surface, a portion from a part of a fastener head portion of the fastener F1 to a lower end of the fastener F1 except for a portion supported by the first support portion 51H and the second support portion 52H.

An opening penetrating in the upper-lower direction is formed between the pair of first leg portion 51FA and first leg portion 51FB. An opening penetrating in the upper-lower direction is formed between the pair of second leg portion 52FA and second leg portion 52FB.

Effects similar to those of the fastener support 10 can be exerted in the fastener support 50.

Further, as shown in the fastener F1 in the same figure, when a fastener of a type having a fastener head portion having a large diameter is supported, the fastener may be supported such that a part of the fastener head portion is inserted into the opening on the upper portion (for example, 22OP) in both the fastener support 10 and the fastener support 50. Further, when the fastener head portion is large, the fastener may be supported such that the part of the fastener head portion projects rearward from the opening on the upper portion (for example, 22OP).

With this configuration, since it is possible to suppress the distance between the fastener and the fastener support compared to a known fastener support, it is possible to promote the reduction in the diameter of the coupled fastener wound in the spiral shape.

{Coupled Fastener}

As shown in FIG. 6 and the like, the plurality of fastener supports 10 that support the fasteners F are coupled in the width direction to form the coupled fastener 100. The lower portion 21 (the first portion 21) and the upper portion 22 (the second portion 22) of one fastener support 10 provided in the coupled fastener 100 are respectively coupled to the lower portion 21 and the upper portion 22 of another adjacent fastener support 10.

Note that a slit 21S extending upward and approaching the upper portion 22 may be formed between the lower portion 21 of the fastener support 10 and the lower portion 21 of the adjacent fastener support 10 so as to reduce the width of the lower portion 21.

By forming the slit 21S, when the fastener F is struck by the driver of the driving tool and moved downward, deformation and rotation of the first tab 31 connected to the lower portion 21 can be promoted. Thus, it is possible to suppress the first tab 31 from excessively inhibiting the downward movement of the fastener F.

According to the above configuration, since the first tab 31 and the second tab 32 are retracted from an injection path in a driving tool 110 by rotating so as to be substantially parallel to the plate-shaped member 20, it is possible to suppress the movement of the fastener F from being hindered.

{Manufacturing Method}

Figure 11:
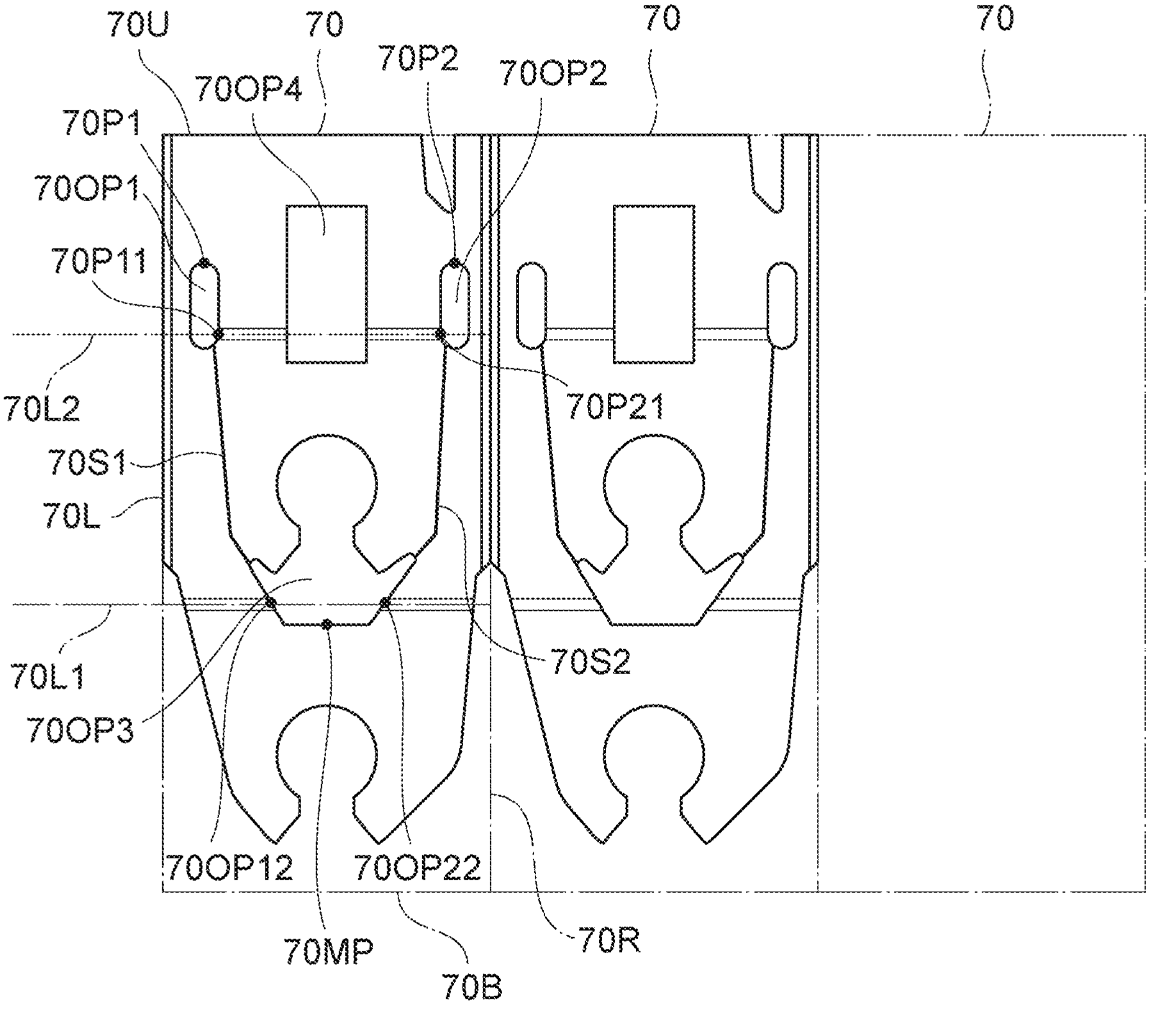
FIG. 11 is a front view showing a manufacturing process of a fastener support according to the illustrative embodiment of the present disclosure.

Next, a manufacturing method of the fastener support 10 will be described. FIG. 11 is a front view (a view seen from the X-axis positive direction) showing the plate-shaped member before a process of bending the portion corresponding to a tab of an original member 70 after a process in which cuts and openings are formed in the original member 70 in a manufacturing process of the fastener support 10.

First, the original member 70 which is the source of the fastener support 10 is formed. The original member 70 is, for example, a plate-shaped member formed by resin molding.

The original member 70 has an upper end edge 70U, a lower end edge 70B, a first side end edge 70L and a second side end edge 70R each of which connects the upper end edge 70U to the lower end edge 70B, and is formed in a rectangular shape in a front view, for example. Typically, the original members 70 are formed at one time in a way that the second side end edge 70R of the adjacent one original member 70 is coupled to the first side end edge 70L of the other adjacent original member 70. However, the plurality of original members 70 may be formed at one time in a way that the lower end edge 70B of the adjacent one original member 70 is coupled to the upper end edge 70U or the lower end edge 70B of the other adjacent original member 70, or in a matrix. When the plurality of original members 70 are formed at one time, a periodically formed member including a portion that becomes the single fastener support 10 later corresponds to the single original member 70.

Subsequently, by forming the cuts and the openings at a plurality of positions of the original member 70, the plate-shaped member before bending the portion corresponding to the tab is formed. The order in which the cuts are made and the order in which the openings are formed in the original member are unordered, and the plurality of cuts and openings described below may be formed simultaneously, for example.

Further, a known method can be employed for slit processing for making the cuts and the punching for forming the openings. For example, the cuts and the openings may be formed by pressing an original material with a punch formed according to shapes of the cuts and openings to be formed. Further, forming may be performed simultaneously as the formation of the cuts and the openings to perform a bending process to be described later.

First, a first cut 70S1 is formed in the original member 70. The first cut 70S1 is a cut that connects a first position 70P1 of the original member 70 to a relay position 70MP. Here, the first position 70P1 is a position closer to the upper end edge 70U than to the lower end edge 70B of the original member 70, and closer to the first side end edge 70L than to the second side end edge 70R of the original member 70. The relay position 70MP is a position closer to the lower end edge 70B than to the first position 70P1, and closer to the second side end edge 70R than to the first position 70P1. Typically, the relay position 70MP is a position closer to the lower end edge 70B than to the upper end edge 70U, and corresponding to an intermediate position between the first side end edge 70L and the second side end edge 70R.

Simultaneously, a second cut is formed in the original member. The second cut is a cut connecting the relay position 70MP of the original member 70 to a second position 70P2. Here, the second position 70P2 is a position closer to the upper end edge 70U than to the lower end edge 70B of the original member 70, and closer to the second side end edge 70R than to the first side end edge 70L of the original member 70.

Since the second opening 22OP is further formed in the fastener support 10 of the present illustrative embodiment (FIG. 3), an opening 700P4 extending in the upper-lower direction is formed between the first position 70P1 and the second position 70P2 in the left-right direction and above the relay position 70MP (and an opening 70OP3) in the upper-lower direction simultaneously.

Since the first slit 22S1 and the second slit 22S2 are formed in the fastener support of the present illustrative embodiment (FIG. 3), an opening 70OP1 corresponding to the first slit 22S1 is formed such that a part of the first cut 70S1 including the first position 70P1 becomes a part of the opening edge, and similarly, an opening 70OP2 corresponding to the second slit 22S2 is formed such that a part of the second cut 70S2 including the second position 70P2 becomes a part of the opening edge.

The fastener support 10 of the present illustrative embodiment further includes the second tab 32 including the second support portion 32H having the pair of portions extending in the arm shape ("arm portions") for supporting the fastener body portion FB. Therefore, the opening 70OP3 corresponding to the shape of the arm portion of the second support portion 32H is formed simultaneously such that the cut extending from the part of the first cut 70S1 including the relay position 70MP to the part of the second cut 70S2 becomes the part of the opening edge. However, a portion corresponding to the second tab 32 may be formed when the original member 70 is formed by resin molding or the like.

As described above, the original member 70 is formed with the cut connecting the first position 70P1 to the second position 70P2 via the relay position 70MP, the opening 70OP3 that includes the relay position 70MP as the lower end of the opening edge, and the opening 700P4 above the opening 700P3 in a region corresponding to between the first position 70P1 and the second position 70P2 in the left-right direction.

Since the fastener support 10 of the present illustrative embodiment further includes the first tab 31 including the first support portion 31H, the portion corresponding to the first tab 31 including the first support portion 31H may be formed simultaneously by further making a cut by cutting off the lower end edge 70B of the original member 70 and the lower end portions of the first side end edge 70L and the second side end edge 70R simultaneously. However, a portion corresponding to the first tab 31 may be formed when the original member 70 is formed by resin molding.

Subsequently, by bending the original member according to a predetermined crease, the portion corresponding to the second tab 32 and the portion corresponding to the first tab 31 are erected on another portion of the original member 70 to manufacture the fastener support 10. The forming process may be performed simultaneously with the process of forming the cut or the like. Further, at the time of performing the process in which the cut is made, a portion corresponding to the crease and a portion coupled to the adjacent original member may be half cut to make the cut. Further, instead of the half cut, a V-notch or a cut by perforation may be made.

As shown in the same figure, a second crease for providing the second tab 32 is set on a second virtual straight line 70L2 that passes through a position 70P11 on the first cut 70S which is closer to the first position 70P1 than to the relay position 70MP and a position 70P21 on the second cut 70S which is closer to the second position 70P2 than to the relay position 70MP, passes through the opening 700P4, and is parallel to the left-right direction.

By using the second crease (the second virtual straight line 70L2) as a crease and bending a portion below the second crease and surrounded by the first cut S1 and the second cut S2 so as to be erected from the other portion of the original member 70, it is possible to provide the second tab 32 having the second support portion 32H formed to be able to detachably support the second support position FP2 of the fastener F in front of the other portion of the original member 70.

Here, since the second virtual straight line 70L2 including the second crease passes through the opening 70OP4, an erected portion from below the second crease (second virtual straight line 70L2) to a lower end of the opening 700P4 becomes the pair of second leg portions 32F.

That is, the upper portion of the opening 700P4 corresponds to the second opening 22OP which penetrates the plate-shaped member 20 in the front-rear direction, the lower portion corresponds to the opening 32OP which is formed between the pair of second leg portions 32F and penetrates the second tab 32 in the upper-lower direction.

As shown in the same figure, a first crease for providing the first tab 31 is set on the first virtual straight line 70L1 that passes through a position 70P12 on the first cut 70S1 which is closer to the relay position 70MP than to the first position 70P1 and a position 70P22 on the second cut 70S2 which is closer to the relay position 70MP than to the second position 70P2, passes through the opening 70OP3, and is parallel to the left-right direction.

By using the first crease (the first virtual straight line 70L1) as the crease and bending a portion below the first crease such that the portion is erected from the other portion of the original member 70, it is possible to provide the first tab 31 having the first support portion 31H formed to be able to detachably support the first support position FP1 of the fastener F in front of the other portion of the original member 70.

Thus, the fastener support 10 can be manufactured. The above process of forming the cuts and openings and the bending process may be performed simultaneously for the plurality of coupled original members 70.

Thereafter, the fastener support 10 and the coupled fastener 100 including the fastener F can be manufactured by inserting the fastener F between the pair of arm portions of each support portion such that the first support portion 31H and the second support portion 32H support the fastener F.

{Method of Using Coupled Fastener}

Next, a method of using the coupled fastener 100 according to the present illustrative embodiment will be described. In the present illustrative embodiment, an illustrative embodiment in which the fastener F of the coupled fastener 100 is driven by using the pneumatic driving tool 110 using compressed air will be described. However, the fastener disclosed in the present illustrative embodiment may be configured to be driven by another type of driving tool (for example, an electric driving tool of driving a fastener using a motor or the like).

Figure 12:
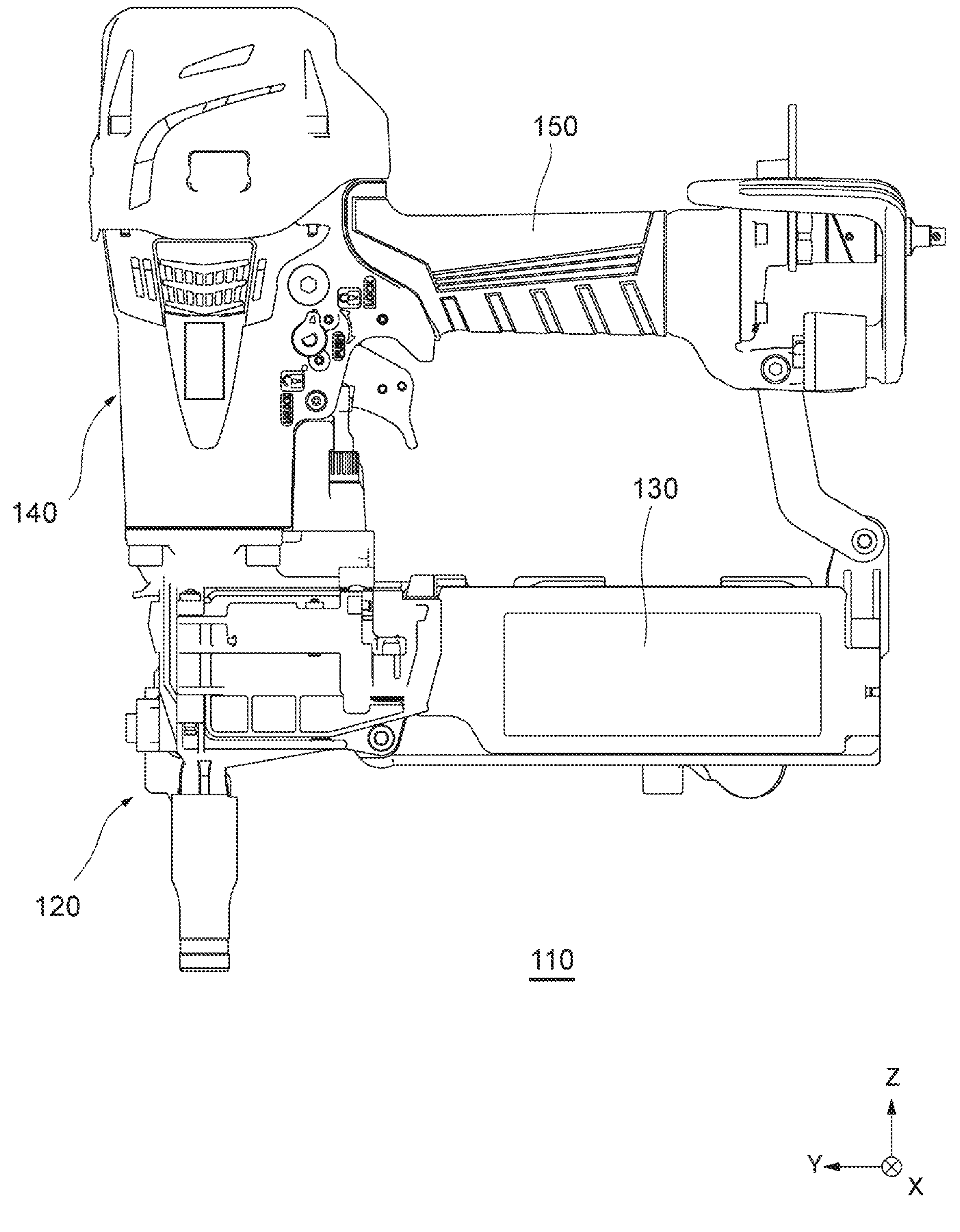
FIG. 12 shows a driving tool according to the illustrative embodiment of the present disclosure.

FIG. 12 shows an example of the pneumatic type driving tool 110 that drives the fastener F of the coupled fastener 100. The driving tool 110 includes a nose portion 120, a magazine 130 installed at a lateral side of the nose portion 120, a body housing 140 as an enclosure, and a grip 150 provided at a substantially right angle to the body housing 140. Inside the body housing 140, a striking cylinder (not shown), a striking piston (not shown) slidably accommodated in the striking cylinder, and a driver provided to be coupled to the striking piston are disposed, and the driving tool 110 further includes a fastener feeding mechanism (not shown) for feeding the coupled fastener 100 loaded in the magazine 130 to the nose portion 120. An air chamber (not shown) for storing compressed air is provided inside the grip 150. The compressed air is supplied from a compressor, which is an external device, to the driving tool 110 using a hose, for example.

As shown in FIG. 9, the magazine 130 accommodates the coupled fastener 100 in a state in which the fasteners F are wound in the spiral shape on the inner side with respect to the fastener supports 10 that support the fasteners F.

The nose portion 120 is a portion for striking and driving the fastener F. The leading fastener F of the coupled fastener 100 is supplied to the injection path of the nose portion 120 while being supported by the fastener support 10 by the feeding mechanism. On the other hand, when the compressed air stored in the air chamber is filled in the striking cylinder in accordance with an operation of a trigger or the like, since the striking piston is driven by expansion of the compressed air in the cylinder, a driver coupled to the striking piston enters the nose portion 120 and strikes the fastener F. Therefore, it is possible to drive the fastener F downward into the workpiece.

The first tab 31 and the second tab 32 supporting the struck fastener F rotate by the fastener head portion FH moving downward and become substantially parallel to the plate-shaped member 20. Thereafter, the fastener supports 10 separated from the fasteners F are sequentially discharged from a discharge port provided in the nose portion 120 (FIG. 13A).

Figure 13A:
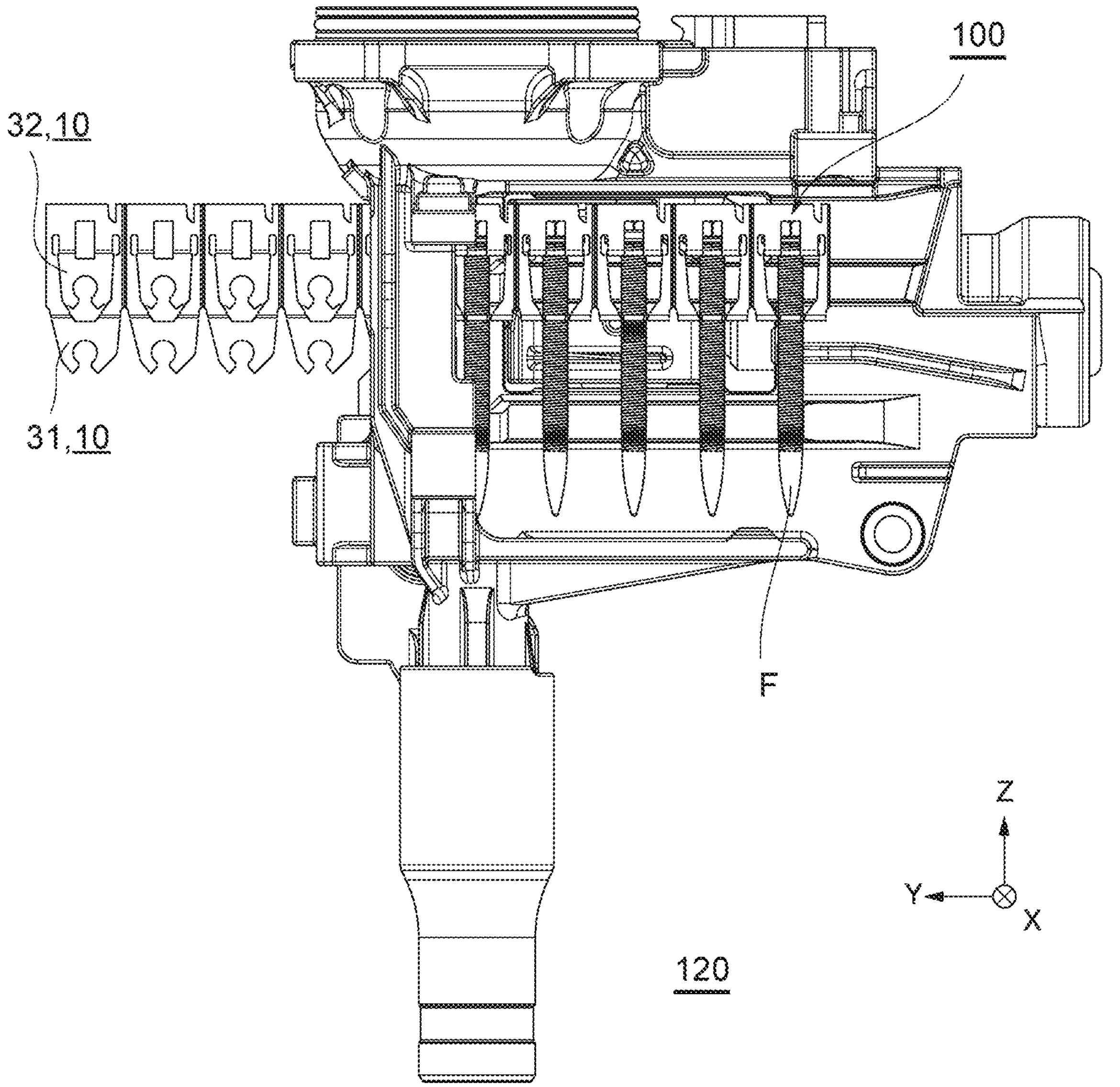
FIG. 13A is a nose portion of the driving tool according to the illustrative embodiment of the present disclosure.

FIG. 13A is a view showing an internal configuration of the nose portion 120 (for the sake of convenience, the fastener F in the nose portion 120 and a door covering a passage of the fastener F fed from the magazine 130 to the injection path are not shown). FIG. 13B is a perspective view showing a state in which the coupled fastener 100 and the check claw are engaged.

A known configuration can be used for the feeding mechanism that supplies the coupled fastener 100 to the injection path of the nose portion 120. For example, the feeding mechanism includes: the feeding claw for engaging the fastener body portion FB of the first fastener F of the coupled fastener 100; a biasing member (for example, a spring) for biasing the feeding claw in a predetermined direction (Y-axis positive direction in FIGS. 12 and 13A), which is the moving direction of the fastener F, in order to supply the leading fastener F engaged with the feeding claw into the injection path and to move the feeding claw in the predetermined direction (Y-axis positive direction in FIGS. 12 and 13A); an air cylinder for moving the feeding claw in an opposite direction opposite to the predetermined direction (Y-axis negative direction in FIGS. 12 and 13A) against a biasing force of a biasing member after the fastener F is supplied to the injection path and for engaging the next fastener F; and a check claw 160 (an example of an "engaging claw") engaged with the fastener support 10 of the coupled fastener 100 such that when the feeding claw is moved in the direction opposite to the predetermined direction (Y-axis negative direction in FIGS. 12 and 13A) by the air cylinder, even the coupled fastener 100 does not move in the opposite direction.

The compressed air supplied to the striking cylinder for driving the driver is supplied to a feeding air cylinder when the driver completes the driving of the fastener F. Therefore, when the driver completes the driving of the fastener F, the feeding air cylinder moves the feeding claw in the opposite direction against the biasing force of the biasing member. The feeding claw is swingably connected to the air cylinder in order to move over the fastener body portion FB of the next fastener F and engage the fastener body portion FB. The air supplied to the air cylinder is configured to be exhausted while the driver and the piston that have completed driving return to their initial positions, so that after the feeding claw is engaged with the fastener body portion FB of the next fastener F, the biasing member moves the next fastener F in a predetermined direction (supply direction).

In the driving tool 110 configured as described above, the check claw 160 is, for example, disposed inside the door making up the enclosure portion of the nose portion 120. This is to engage the check claw 160 with the fastener support 10 from the side of the fastener support 10, which is opposite to the side where the feeding claw that is engaged with the fastener F is located.

Figure 13B:
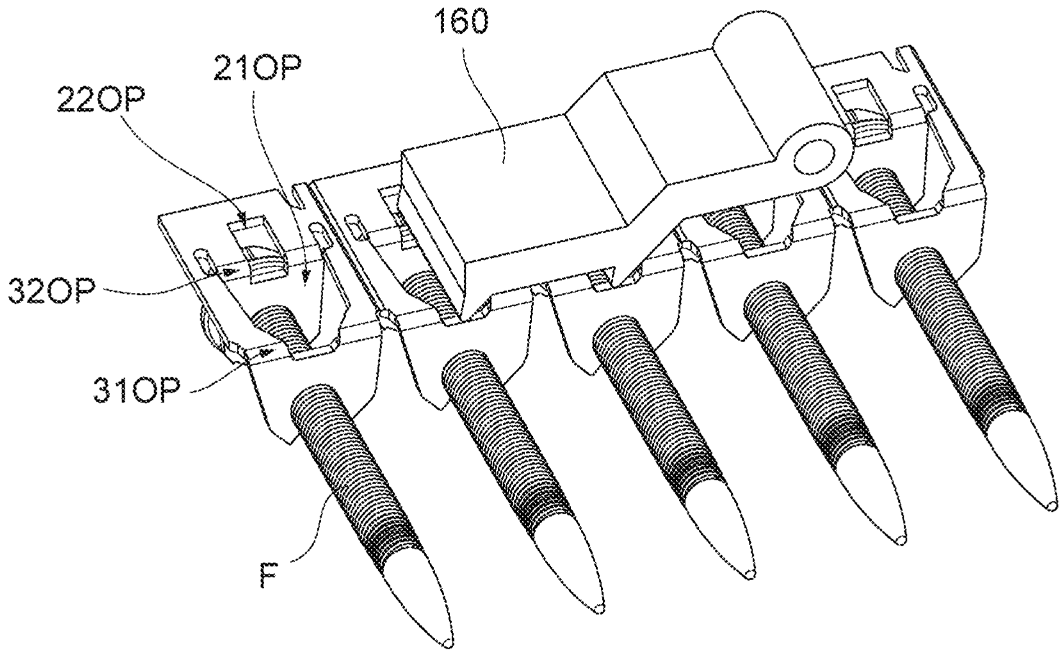
FIG. 13B is a perspective view showing how the fastener supports according to the illustrative embodiment of the present disclosure is fed.

As shown in FIG. 13B, the check claw 160 extending in the upper-lower direction can enter the second opening 22OP of the fastener support 10, the region between the pair of second leg portions 32F, the first opening 21OP, and the region between the pair of first leg portions 31F, and can be engaged with the fastener support 10.

According to such a configuration, since the long opening extending in the upper-lower direction is formed in the fastener support 10, the check claw 160 extending in the upper-lower direction can enter the opening. Therefore, a posture of the fastener support 10 can be stabilized in a state in which the fastener F and the feeding claw are engaged. Further, even if the fastener support 10 is displaced in the upper-lower direction, it is possible to reliably engage the fastener support 10 with the check claw 160.

As shown in the same figure, by providing the plurality of check claws 160, the plurality of fastener supports 10 may be configured to be engageable simultaneously. Further, the check claw 160 may not be engaged with the heading fastener support 10.

Since the first tab 31 and the second tab 32 are rotated by the fastener head portion FH moving downward and become substantially parallel to the plate-shaped member 20, the fastener support 10 is discharged from the driving tool 110 in a plate-shaped state. Therefore, the discharge port of the fastener support 10 provided in the nose portion 120 of the driving tool 110 is formed in a shape (for example, a line shape long in the upper-lower direction and thin in the front-rear direction) through which the fastener support 10 deformed into the plate shape can pass.

If a large discharge port is formed, or if a discharge port is bent not only in the upper-lower direction but also in the front-rear direction, the nose portion needs to be enlarged to ensure the strength of the nose portion where high stress is generated. In comparison, by employing the coupled fastener 100 including the fastener supports 10 according to the present illustrative embodiment, it is possible to form the discharge port that suppresses a decrease in strength compared to the related art.

Further, various modifications can be made without departing from the scope of the present invention. For example, it is possible to add a part of constituent elements of an illustrative embodiment to another illustrative embodiment within the scope of the ordinary creativity of a person skilled in the art. In addition, it is possible to replace a part of constituent elements of an illustrative embodiment with corresponding constituent elements of another illustrative embodiment.

What is claimed is:

1. A fastener support comprising:

a plate-shaped member having a first portion which is a lower portion and a second portion which is an upper portion;

a first tab erected from the first portion, the first tab having a first support portion that detachably supports a first position of a fastener in front of the plate-shaped member; and a second tab erected from a lower end of the second portion, the second tab having a second support portion that detachably supports a second position of the fastener, which is above the first position, in front of the plate-shaped member, wherein the first portion has a first opening, which is connected to a lower end and an upper end of the first portion, and through which the second tab is allowed to pass in a case where the second tab is rotated about the lower end of the second portion as a fulcrum, wherein the second portion has a second opening, which is connected to an upper end of the first opening at the lower end of the second portion, and which allows at least a part of the fastener from the second position of the fastener to be visually recognized from the rear, wherein the first tab includes a pair of first leg portions that are erected from the first portion with the first opening interposed therebetween and connect the first support portion to the first portion, and wherein the second tab includes a pair of second leg portions that are erected from the lower end of the second portion with the second opening interposed therebetween and connect the second support portion to the second portion.

2. The fastener support according to claim 1, wherein a width of the first opening in a width direction perpendicular to an upper-lower direction and a front-rear direction is larger than a width of the second opening.

3. The fastener support according to claim 1, wherein a width of the first support portion in a width direction perpendicular to an upper-lower direction and a front-rear direction at a position passing through a central axis of the fastener is larger than a width of the second support portion at a position passing through the central axis of the fastener.

4. The fastener support according to claim 1, wherein in the second portion, a first slit connected to one end portion in a width direction of the upper end of the first opening and a second slit connected to the other end portion in the width direction of the upper end of the first opening are further formed, and wherein the second opening is connected to the upper end of the first opening in a region including a central portion in the width direction of the upper end of the first opening between the first slit and the second slit.

5. The fastener support according to claim 1, wherein the first opening is formed to have a portion having a larger width toward an upper side.

6. The fastener support according to claim 1, wherein the second opening is formed to have a portion having a larger width toward an upper side.

7. The fastener support according to claim 1, wherein a length of the second tab is larger than a height from the lower end to the upper end of the first portion.

8. The fastener support according to claim 1, further comprising:

the fastener supported by the first tab and the second tab, wherein a part of a head portion of the fastener is inserted into the second opening.

9. The fastener support according to claim 1, wherein an interval between the pair of first leg portions decreases as approaching the first support portion.

10. The fastener support according to claim 1, wherein an interval between the pair of second leg portions decreases as approaching the second support portion.

11. A coupled fastener that couples a plurality of fastener supports each of which supports a fastener, the coupled fastener comprising:

a plate-shaped member having a first portion which is a lower portion and a second portion which is an upper portion;

a first tab erected from the first portion and having a first support portion that detachably supports a first position of the fastener in front of the plate-shaped member; and a second tab erected from a lower end of the second portion and having a second support portion that detachably supports a second position above the first position of the fastener in front of the plate-shaped member, wherein the first portion has a first opening, which is connected to a lower end and an upper end of the first portion, and through which the second tab is allowed to pass in a case where the second tab is rotated about the lower end of the second portion as a fulcrum, wherein the second portion has a second opening, which is connected to an upper end of the first opening at the lower end of the second portion, and which allows at least a part of a fastener head portion of the fastener from the second position of the fastener to be visually recognized from the rear, wherein the first tab includes a pair of first leg portions that are erected from the first portion with the first opening interposed therebetween and connect the first support portion to the first portion, wherein the second tab includes a pair of second leg portions that are erected from the lower end of the second portion with the second opening interposed therebetween and connect the second support portion to the second portion, and wherein a plurality of the fastener supports are provided in a state in which the first portion of one of adjacent fastener supports is coupled to the first portion of the other of the adjacent fastener supports, and the second portion of the one of the adjacent fastener supports is coupled to the second portion of the other of the adjacent fastener supports.

12. The coupled fastener according to claim 11, wherein the fastener is wound in a spiral shape in a position relationship in which the fastener is positioned on an inner side with respect to a fastener support of the plurality of the fastener supports that supports the fastener.

13. A coupled fastener to be loaded into a driving tool that drives a fastener into a workpiece, the coupled fastener comprising:

the fastener support according to claim 1, wherein the coupled fastener is configured to allow an engaging claw provided in the driving tool to enter the second opening, a region between the pair of second leg portions, the first opening, and a region between the pair of first leg portions and to be engaged.

14. A manufacturing method of a fastener support, comprising:

forming a plate-shaped original member having an upper end edge, a lower end edge, and a first side end edge and a second side end edge that connect the upper end edge to the lower end edge;

forming a first cut, a second cut and an opening in the original member, the first cut connecting a first position that is closer to the upper end edge than to the lower end edge and closer to the first side end edge than to the second side end edge to a relay position that is closer to the lower end edge than to the upper end edge, the second cut connecting a second position that is closer to the upper end edge than to the lower end edge and closer to the second side end edge than to the first side end edge to the relay position, and the opening being located between the first position and the second position;

providing a first tab by using a first virtual straight line passing through a position on the first cut closer to the relay position than to the first position and a position on the second cut closer to the relay position than to the second position as a crease and bending a portion of the original member including the lower end edge such that the portion is erected from the other portion, the first tab having a first support portion formed to be able to detachably support the first position of a fastener in front of the other portion; and providing a second tab by using a second virtual straight line passing through a position on the first cut closer to the first position than to the relay position and a position on the second cut closer to the second position than to the relay position and passing through the opening as a crease and bending a portion of the original member surrounded by the first cut and the second cut such that the portion is erected from the other portion, the second tab having a second support portion formed to be able to detachably support the second position of the fastener above the first position in front of the other portion.

* * * * *